United States Patent
Kamei

(10) Patent No.: US 6,243,492 B1
(45) Date of Patent: Jun. 5, 2001

(54) IMAGE FEATURE EXTRACTOR, AN IMAGE FEATURE ANALYZER AND AN IMAGE MATCHING SYSTEM

(75) Inventor: Toshio Kamei, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/517,317

(22) Filed: Mar. 2, 2000

Related U.S. Application Data

(62) Division of application No. 08/991,304, filed on Dec. 16, 1997.

(30) Foreign Application Priority Data

Dec. 16, 1996 (JP) .................................................... 8-353220

(51) Int. Cl.[7] .................................................... G06K 9/00
(52) U.S. Cl. ........................... 382/181; 382/124; 382/197
(58) Field of Search ................................... 382/197, 209, 382/219, 115, 203, 204, 113, 116, 124, 125, 126, 127, 309, 190, 278, 252

(56) References Cited

U.S. PATENT DOCUMENTS

| | | | |
|---|---|---|---|
| 4,827,527 | 5/1989 | Morita et al. | 382/127 |
| 4,872,203 | 10/1989 | Asai et al. | 382/124 |
| 4,956,870 | 9/1990 | Hara | 382/124 |
| 5,040,224 | 8/1991 | Hara | 382/124 |
| 5,659,626 | 8/1997 | Ort et al. | 382/125 |
| 5,717,786 | 2/1998 | Kamei | 382/204 |

FOREIGN PATENT DOCUMENTS

| | | |
|---|---|---|
| 0 220 032 | 4/1987 | (EP) . |
| 63-34508 | 7/1988 | (JP) . |
| 1-271884 | 10/1989 | (JP) . |
| 8-7097 | 1/1996 | (JP) . |

OTHER PUBLICATIONS

Uchida et al., "Fingerprint Card Classification for Identification with a Large–Size Database" NEC Corporation (abstract) *IEICE* pp. 25–32.

Sasakawa et al., "Personal Verification System with High Tolerance of Poor Quality Fingerprints" *IEICE* 72:707–714 (1989).

Wilson et al., "Massively parallel Neural Network Fingerprint Classification System" *NISTIR 4880* pp. 1–66 (1992).

Turk et al., "Eigenfaces for Recognition" *MIT Technical Report* #154 pp. 1–27 (1990).

Moghaddam et al., "Probabilistic Visual Learning for Object Detection" *IEEE* pp. 786–793 (1995).

Takagi et al., "Handbook of Image Analysis" pp. 1–11, 40–43, 422–429 and 625–659 (1991).

Kato et al., "A Handwritten Character Recognition System Using Modified Mahalanobis Distance" *IEICE D–II* 79:45–52 (1996).

Asai et al., "Automated Fingerprint Identification by Minutia–Network Feature matching Processes" *IEICE D–II* 72:733–740.

*Primary Examiner*—Joseph Mancuso
*Assistant Examiner*—Vikkram Bali
(74) *Attorney, Agent, or Firm*—Foley & Lardner

(57) ABSTRACT

For providing an efficient image pattern matching system, an image feature extractor (11) of the invention comprises a feature vector extraction means (101) for extracting a feature vector from the pattern image, a quality index extraction means (106) for extracting quality index information of the pattern image, an error distribution information storing means (105) wherein error distribution information representing correlation between error distribution of the feature vector and the quality index information is prepared, and a confidence attribution means (107) for obtaining confidence estimation information referring to the error distribution information retrieved with the quality index information. The image feature analyzer (51) prepares the errors distribution information. An image feature matching system collates feature information of an image pattern extracted by the image feature extractor (11) by comparing it to registered feature information.

1 Claim, 12 Drawing Sheets

FIG.3
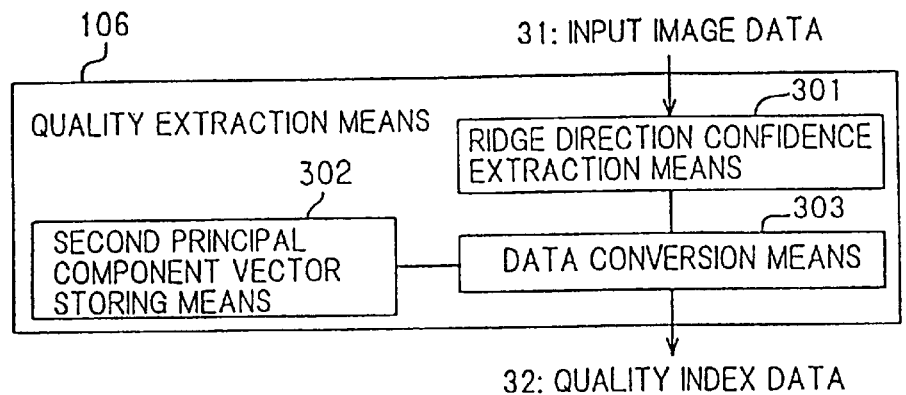
FIG.4
|  | $Q_i < \alpha_1$ | $\alpha_1 \leq Q_i < \alpha_2$ | $\cdots$ | $\alpha_{n-1} \leq Q_i$ |
|---|---|---|---|---|
| $Q_1$ | $\sigma_{1,1}$ | $\sigma_{1,2}$ | $\cdots$ | $\sigma_{1,n}$ |
| $Q_2$ | $\sigma_{2,1}$ | $\sigma_{2,2}$ | $\cdots$ | $\sigma_{2,n}$ |
| $\vdots$ | $\vdots$ | $\vdots$ | $\ddots$ | $\vdots$ |
| $Q_L$ | $\sigma_{L,1}$ | $\sigma_{L,2}$ | $\cdots$ | $\sigma_{L,n}$ |
FIG.5
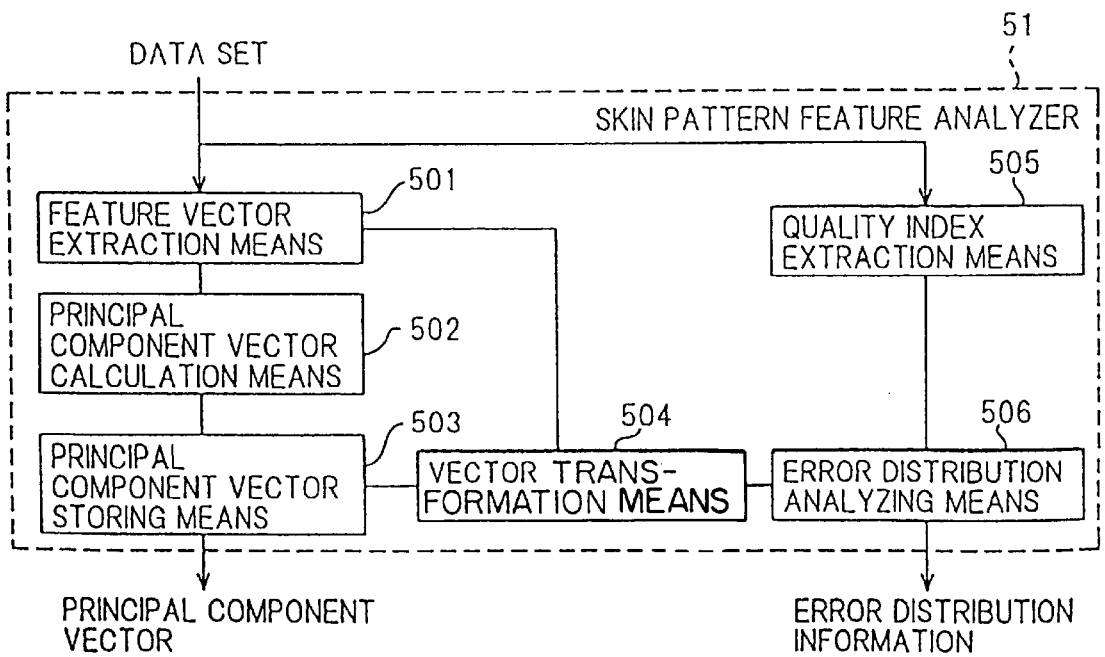

FIG.9
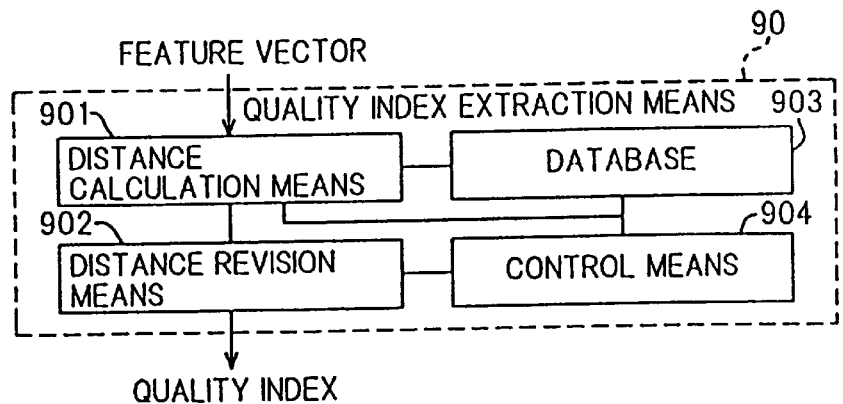
FIG.10
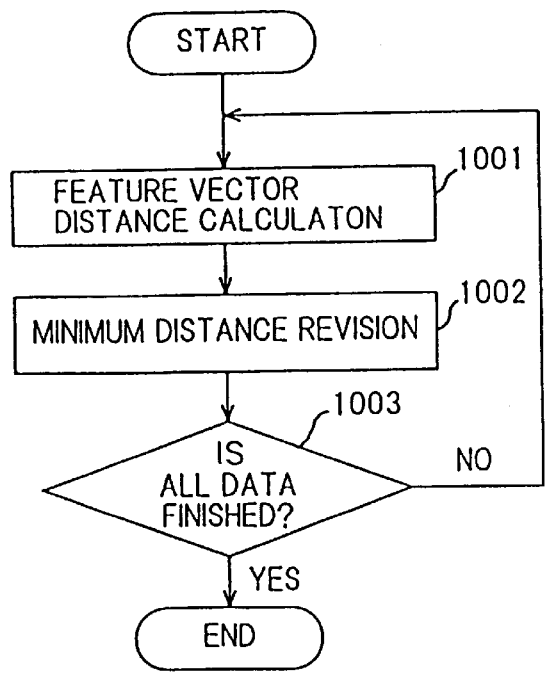
FIG.11
| | $Q < \alpha_1$ | $\alpha_1 \leq Q < \alpha_2$ | $\cdots$ | $\alpha_{n-1} \leq Q$ |
|---|---|---|---|---|
| Q | $\sigma_1$ | $\sigma_2$ | $\cdots$ | $\sigma_n$ |

IMAGE FEATURE EXTRACTOR, AN IMAGE FEATURE ANALYZER AND AN IMAGE MATCHING SYSTEM

This application is a divisional of application Ser. No. 08/991,304, filed Dec. 16, 1997.

BACKGROUND OF THE INVENTION

The present invention relates to an image feature extractor for extracting image features of a pattern image such as a skin pattern image represented by a fingerprint or a palm-print, an image feature analyzer for analyzing the image features, and an image matching system for collating the pattern image with those filed in a database.

In a following description, the present invention is explained in connection with a skin pattern feature extractor, a skin pattern feature analyzer and a skin pattern matching system applied to personal identification as representative examples of the above devices. However, it will be easily understood that the present invention can be widely applied to matching verification of pattern images having certain features, without limited to the skin pattern matching verification.

As a most orthodox art for identifying a skin pattern such as a fingerprint or a palm-print, there is known a matching verification method making use of feature points of the fingerprint called the minutia matching which is disclosed in a Japanese Patent entitled "Fingerprint Collation System" published as a specification No. 63-34508. However, a demerit of the minutia matching is that it takes a lot of computational time because of a large amount of data to be processed.

For lightening the demerit, there is proposed a technique for reducing a number of candidates to be verified by way of the Ten Print Card, which is disclosed in "Fingerprint Card Classification for Identification with a Large-Size Database" by Uchida, et al., Technical Report of IEICE (The Institute of Electronics, Information and Communication Engineers) PRU95-201 (January 1996). In the Fingerprint Classification of this technique, a high-speed rough matching is performed referring to certain features such as the basic fingerprint classification category, distances between singular points, namely, cores or deltas, etc., for pre-selecting candidates to be verified with the minutia matching. As the basic fingerprint classification categories, fingerprint pattern of each finger is classified into one of basic clasification categories, such as the Whorl, the Right Loop, the Left Loop or the Arch, and numbers of ridge lines and the distances between cores and deltas of each finger are extracted as other features together with their confidence values, for the rough matching of the technique.

Data amount of these features is at most several hundred bytes for a card, far smaller that the several thousand bytes necessary for the minutia matching. The smaller data amount, and consequently the smaller calculation amount enable a high-speed fingerprint verification.

Thus reducing number of candidates before the minutia matching, the pre-selection technique of the prior document by Uchida et al. enables to improve total cost performance of the fingerprint verification system as a whole.

However, because the deltas are usually found in edge parts of the fingerprint, the numbers of ridge lines and the distances between a core and a delta are often difficult to be extracted when a so called roll printing is not performed correctly. The roll printing means here to take the fingerprint pattern by pressing a fingertip rolling on a card, as usually performed when the police take the fingerprint. Furthermore, the above technique is not efficient to pre-select the Arch patterns which have no delta.

Therefore, methods for improving pre-selection performance have been sought. One promising solution is to find other appropriate features to be used for the rough matching in place of or in addition to the above features. One of the possible features is the direction pattern of fingerprint ridge lines. "Personal Verification System with High Tolerance of Poor Quality Fingerprints" by Sasagawa et al., the transactions of IEICE D-II, Vol. J72 -D-II, No. 5, pp. 707–714, 1989, is an example of usage of the direction pattern to the rough matching.

Feature value having such many dimensions as the direction pattern of the fingerprint ridge lines, however, makes difficult the high-speed matching verification. Therefore, when applying such feature value, it is necessary to find a feature extraction method enabling to extract a condensed feature value thereof having an appropriate dimension size giving good results and sufficient efficiency at the same time. A well-known method of such a feature extraction is the principal component analysis. An example of the method applied to the direction pattern of the fingerprint ridge lines is described in a paper of C. L. Wilson et al., entitled "Massively Parallel Neural Network Fingerprint Classification System", NISTIR 4880, 1992, July, published by National Institute of Standards and Technology.

In the method of C. L. Wilson et al., the direction pattern is processed as follows.

First, training data of N fingerprint images are prepared. Then, defining feature vectors composed of ridge directions each representing local flow of ridge lines, the principal component analysis is performed for distribution of the feature vectors to obtain principal component vectors having larger eigenvalues. Using the principal component vectors thus obtained, Karhunen Loève Transform (hereafter abbreviated as KLT) of the feature vector of an objective fingerprint image is performed, whereof feature values of upper dimensions are extracted as the condensed feature value.

In the following paragraphs, more details of the feature extraction using the KLT are described.

For the first, a variance-covariance matrix V is calculated as follows from feature vectors $u_i$ (i=1 to N) of the fingerprint images prepared for the training.

$$V = \frac{1}{N-1} \sum_{i=1}^{N} (u_i - \bar{u})(u_i - \bar{u})^t \quad (1)$$

$$\bar{u} = \frac{1}{N} \sum_{i=1}^{N} u_i \quad (2)$$

Here, the feature vectors $u_i$ are column vectors of M dimensions, $\bar{u}$ is a mean vector of $u_i$, and the upper suffix $t$ means a transpose.

Eigenvalues of the variance-covariance matrix V being represented by $\lambda_i$ (i=1, . . . , M; $\lambda_i > \lambda_{i+1}$), eigenvalues corresponding to the eigenvalues $\lambda_i$ are represented by $\Psi_i$. These eigenvectors $\Psi_i$ are the principal component vectors and one corresponding to a largest eigenvalue $\lambda_1$ is called a first principal component vector, followed by a second, a third, . . . , a M-th principal component vector in the order of corresponding eigenvalue.

For a feature vector u of an objective fingerprint image, which is not used for the training, projection of the feature vector u to a partial space defined by one or more primary (corresponding to largest eigenvalues) principal component vectors $\Psi_i$ is calculated, that is, projection components $v_i$ around the mean vector $\bar{u}$ are obtained as follows:

$$v_i = \Psi_i{}^t(u - \bar{u})$$

The projection components $v_i$ thus obtained are the feature values extracted by way of the KLT.

In C. L. Wilson et al., a feature vector composed, as its components, of primary projection components $v_i$ corresponding to the primary principal component vectors is input to a neural network for the fingerprint classification. However, these extracted feature values are used only for the classification and any application to the matching verification is not taught therein.

Although it is not applied to the skin pattern analysis, there is described an example of a facial image matching verification making use of feature values obtained by the KLT, in "Eigenfaces for Recognition" by A. Pentland et al., MIT Media Lab Vision and Modeling Group, Technical Report #154 and also in "Probabilistic Visual Learning for Object Detection" by B. Moghaddam and A. Pentland, pp. 786–793 of Proceedings of the 5-th International Conference on Computer Vision, 1995. In these two documents, a method of facial image matching verification is described, wherein a vector consisting of each pixel value of a facial image as each component thereof is used as the source feature vector, and the facial matching verification is performed according to Euclidean distance or Mahalanobis distance of the condensed feature vector extracted by way of the KLM of the source feature vector.

However, these prior arts have their demerits when applied to the fingerprint matching verification.

By Uchida et al., it is often difficult to extract sufficient features such as distances or numbers of ridge lines between the core and the delta when the rotation stamping is not performed correctly because the deltas are usually found in edge parts of the fingerprint. Furthermore, the Arch patterns having no delta cannot be pre-selected sufficiently.

In C. L. Wilson et al., there is a description concerning fingerprint feature extraction making use of the KLT applied to fingerprint classification, but no description concerning application thereof to the fingerprint matching verification used, for example, to pre-select the verification candidates, as intended in Uchida et al.

Although not to the fingerprint matching verification, application of the KLT to facial image matching verification is disclosed in the documents of A. Pentland et al. The fingerprint image may be processed according to Euclidean distances or Mahalanobis distances in the same way with the above method of A. Pentland et al. However, many of the available fingerprint images are of fairly low grade and sufficient reliability cannot be expected with such a simple method as that of A. Pentland et al., relying simply upon the condensed feature vector. The reason is that necessary consideration is not paid to confidence of the extracted features there.

It is the same with Uchida et al., wherein the distance between pattern images is defined with a feature value and a confidence value. However, the confidence value is calculated heuristically and there is given no logical evidence.

Therefore, a primary object of the present invention is to embody a matching verification architecture for efficiently collating pattern images such as skin patterns be resolving the above problems, and to provide an image feature extractor, an image feature analyzer and an image matching system, wherein a high-speed and a high-precision processing is realized.

PRINCIPLE OF THE INVENTION

First, principle of the invention will be explained.

When two feature vectors are given, a variety of distances can be defined between the two feature vectors. As examples thereof, following Euclidean distance, weighted Euclidean distance, Mahalanobis distance, etc., are introduced in pp. 652–658 of "Handbook of Image Analysis" by Takagi et al., Tokyo University Press, 1991.

Euclidean distance $\quad D(x, y) = \sqrt{\sum_{i=1}^{n}(x_i - y_i)^2} \quad (4)$ weighted Euclidean distance $\quad D(x, y) = \sqrt{\sum_{i=1}^{n} w_i(x_i - y_i)^2} \quad (5)$ Mahalanobis distance $\quad D(x, y) = \sqrt{(x-y)^t V^{-1}(x-y)} \quad (6)$ where, $x_i$ and $y_i$ are respective components of the two feature vectors x and y both having n dimensions, $w_i$ is a corresponding weight factor, and V is a variance-covariance vector of distribution of the feature vectors.

Among them, the Mahalanobis distance is known to give a most natural distance when the feature vectors accord to normal distribution.

When the two feature vectors x and y are vectors obtained by the KLT, above equation (6) can be represented as follows, which is described also in the documents of A. Pentland et al.

$$D(x, y) = \sqrt{\sum_{i=1}^{n} \frac{(x_i - y_i)^2}{\lambda_i}} \quad (7)$$

where, $\lambda_i$ are eigenvalues of the variance-covariance vector V. A set of eigenvalues $\lambda_i$ is defined for a distribution of whole feature vectors or for each of distributions of respective classes of the feature vectors.

As shown by above equation (7), the Mahalanobis distance of the feature vectors obtained by the KLT needs no matrix operation. It can be calculated with a sample square sum operation compatible to equation (5), enabling to reduce computational time.

Suppose, here, to classify the feature vectors into classes C(Q) according to their feature values Q, the feature values Q (hereafter called the quality indexes) being values having correlation with errors of respective feature vectors. To clarify relation between the quality index and the distance used for discriminating a feature vector, different condensed feature vectors, obtained from a specific object image and having their respective quality indexes Q, are considered. Assuming these condensed feature vectors have been processed through the KLT making use of variance-covariance matrix of distribution of source feature vectors, and representing variance among i-th components of the condensed feature vectors classified into each class C(Q) by $\lambda_i C(Q)$, the Mahalanobis distance between two condensed feature vectors x and y belonging to a specific class C(Q) is expressed as follows:

$$D(x, y) = \sqrt{\sum_{i=1}^{n} \frac{(x_i - y_i)^2}{\lambda_i(C(Q))}} \qquad (8)$$

Here, $\lambda_i(C(Q))$ gives an error variance among the feature vectors since it is a variance of distribution of the feature vectors obtained from the same specific object image, provided that the distribution of the feature vectors of the class C(Q) accords to a normal distribution and the eigenvector of the variance-covariance matrix of distribution of the class C(Q) is the same with the eigenvector of the variance-covariance matrix applied to the KLM.

Now, a case is considered wherein the quality index Q and the error variance $\lambda_i(C(Q))$ have a correlation expressing that the better quality index makes the smaller the error variance as illustrated in FIG. 22 (wherein the correlation is represented by that of an i-th dimension), and two different feature vectors x and y, whereof a distance is calculated, have a common quality index.

Representing the common quality index by $^1Q$ of FIG. 22 and corresponding error variance by $^1\lambda_i$, a distance $D_1(x,y)$ between the two feature vectors is calculated as follows:

$$D_1(x, y) = \sqrt{\sum_{i=1}^{n} \frac{(x_i - y_i)^2}{^1\lambda_i}}, \qquad (9)$$

while another distance $D_2(x,y)$ between the same feature vectors x and y is calculated as follows when they have another common quality index $^2Q$:

$$D_2(x, y) = \sqrt{\sum_{i=1}^{n} \frac{(x_i - y_i)^2}{^2\lambda_i}}. \qquad (10)$$

Here, it is noted that a relation $D_1(x,y) < D_2(x,y)$ stands when the error variance of each i-th dimension had a relation $^1\lambda_i > {}^2\lambda_i$. It means that the Mahalanobis distance varies adaptively to the quality index so as to give a small distance difference estimation when having a poor quality index, that is, giving large error variances $^1\lambda_i$, and a large distance difference estimation when having a good quality index to the same two feature vectors x and y, Euclidean distance thereof being constant.

The fact that the distance varies adaptively to the quality index is significant, since thereby incorrect rejection because of data extracted from low grade images can be effectively reduced.

In Uchida et al., beforehand described, precision of feature extraction is reflected to a distance value by defining the distance value according to the confidence value (which is heuristically calculated as a value reflecting the feature extraction precision). However, the distance value is defined by a product of the confidence value and a difference between two feature values each belonging to each entirely different dimension, which can be said to be the same thing to define the distance value by multiplying the height with the weight. Therefore, there is no statistical or theoretical guarantee of precision improvement, even if some good results may be obtained.

On the other hand, by converting the quality index (which can be said to be the confidence) into each error variance among components of respective dimension of the feature vectors as above described, a measure of distances having the same dimensions with the feature vectors can be defined. The Mahalanobis distance is one of the distances which can be defined with statistical support, although there are some restrictions such as the assumption of the normal distribution.

A good discrimination performance can be thus obtained by defining a distance value supported statistically.

Heretofore, a distance between two different feature vectors is described. This is to explain a fact that a strict value of the Mahalanobis distance, which has a statistical significance, can be obtained concerning feature vectors of a specific object, by assuming a normal distribution of the feature vectors. However, the essential merit of the above quality index does not lie in defining the strict Mahalanobis distance itself, but in reflecting correlation between the quality index shown in FIG. 22 and the error distribution of the feature vectors onto the distance definition.

The Mahalanobis distance, which is adaptive to the above quality index, can be obtained by calculating error distributions of different feature vectors in each class obtained from a specific object and sorting them according to their quality index. However, calculation of such values is applicable only to such a special matching verification wherein few objects are treated and only confirmation of identity thereof is discussed.

For specifying an unknown object, such as intended in the remaining fingerprint verification performed in the criminal investigation, the above distance definition is inapplicable. A distance between feature vectors obtained from different objects should be defined, too.

For the purpose, a distance value which will be described in the following paragraphs can be defined, for example.

A most significant object of the distance definition is to reflect a quality index, or a confidence, to the error distribution. Hence, following three assumptions 1. to 3. are applied to the distance definition.

1. The errors included in a feature vector are dependent on its quality index and independent of the feature vector itself.
2. A distribution of the errors included in feature vectors accords to a normal distribution.
3. Errors corresponding to a difference between two feature vectors can be estimated from the errors included in each of the two feature vectors.

On the three assumptions, a Mahalanobis-like distance function $\tilde{D}(x,y)$ is defined as follows.

$$\tilde{D}(x, y) = \sqrt{\sum_{i=1}^{n} \frac{(x_i - y_i)^2}{\tilde{\lambda}_i}} \qquad (11)$$

$$\tilde{\lambda}_i = {}^x\lambda_i + {}^y\lambda_i \qquad (12)$$

Here, $^x\lambda_i$ and $^y\lambda_i$ are variances of the error distributions, depending on the quality index, of components $x_i$ and $y_i$ of the respective feature vectors x and y, and $\tilde{\lambda}_i$ represents an estimation of errors corresponding to $x_i - y_i$. The error variances $^x\lambda_i$ and $^y\lambda_i$ can be prepared through an examination of respective inter-relations such as illustrated in FIG. 22.

Further, the ordinary Mahalanobis distance is said to have a problem that its discrimination performance is degraded in a range where eigenvalues ($\lambda_i$) are small because its susceptibility to noises (for example, in "A Handwritten Character Recognition System Using Modified Mahalanobis Distance" by Kato et al., the transactions of IEICE D-II, Vol.

J79-D-II, No. 1, pp. 45–52, 1996). Therefore, the distance function may be defined by way of following function.

$$D(x, y) = -\sum_{i=1}^{n} \log \frac{P(d_i \mid \alpha)}{P(d_i \mid \beta)} \quad (13)$$

$$d_i = \frac{x_i - y_i}{\sqrt{\tilde{\lambda}_i}} \quad (14)$$

$$\tilde{\lambda}_i = {}^x\lambda_i + {}^y\lambda_i \quad (15)$$

Here, α represents a set of differences among feature vectors obtained from a specific pattern, and $P(d_i\mid\alpha)$ represents a distribution of the differences in the set, namely, the error distribution. On the other hand, β is a set of differences among feature vectors obtained from whole patterns, and $P(d_i\mid\beta)$ is a distribution of the differences among feature vectors therein.

When the distribution functions $P(d_i\mid\alpha)$ and $P(d_i\mid\beta)$ accord to the normal distribution, they are calculated as follows, firstly.

$$P(d_i \mid \alpha) = \frac{1}{\sqrt{2\pi\lambda_{i,\alpha}}} \exp\left(-\frac{d_i^2}{2\lambda_{i,\alpha}}\right) \quad (16)$$

$$P(d_i \mid \beta) = \frac{1}{\sqrt{2\pi\lambda_{i,\beta}}} \exp\left(-\frac{d_i^2}{2\lambda_{i,\beta}}\right) \quad (17)$$

where $\lambda_{i,\alpha}$ and $\lambda_{i,\beta}$ are variances of respective distribution functions $P(d_i\mid\alpha)$ and $P(d_i\mid\beta)$.

Then, from these distribution functions, the distance function of the equation (13) can be developed as follows.

$$D(x, y) = \frac{1}{2}\sum_{i=1}^{n}\left(\frac{1}{\lambda_{i,\alpha}} - \frac{1}{\lambda_{i,\beta}}\right)d_i^2 + \sum_{i=1}^{n}(\log\lambda_{i,\alpha} - \log\lambda_{i,\beta}) \quad (18)$$

$$= \frac{1}{2}\sum_{i=1}^{n}\left(\frac{1}{\lambda_{i,\alpha}} - \frac{1}{\lambda_{i,\beta}}\right)\frac{(x_i - y_i)^2}{\tilde{\lambda}_i} + \text{const.} \quad (19)$$

Therefore, a Mahalanobis-like distance function such as defined by equation (11) can be composed by obtaining square root of the first term in the right side of equation (19). Difference between the two distance functions is that a weight factor $$\left(\frac{1}{\lambda_{i,\alpha}} - \frac{1}{\lambda_{i,\beta}}\right)$$

is attributed to each dimension of the feature vector, in the equation (19). The weight factor is determined according to the error distribution relative to the distribution of the whole patterns. When the error distribution is sufficiently small compared to the whole pattern distribution, the weight factor becomes large, attaching much importance to corresponding dimension. On the contrary, the error distribution is equivalent to the whole pattern distribution, the weight factor becomes small, corresponding dimension being relatively neglected in effect. Thus, an effective result can be obtained with the distance function of equation (19) even from feature vectors including components giving small eigenvalues $\lambda_i$, that is, susceptible to noises.

Heretofore, the principle of the invention whereon the embodiments are based is described mainly in connection with feature values obtained through the KLT. This is to clarify statistically and theoretically effectiveness of the invention, wherein an error distribution is obtained according to the quality index and reflected to the matching verification.

However, application of this invention is not necessarily limited to the feature values processed by the KLT. The most important essence of the invention lies in providing architecture for enabling matching verification between two image patterns taking in consideration of their confidence, referring to errors of feature values, the errors being adaptively measured according to quality index of the image pattern.

SUMMARY OF THE INVENTION

In order to embody the matching verification architecture based on the above principle, an image feature extractor of the invention for outputting a feature information data set of a pattern image including data of a feature vector of the pattern image and confidence estimation information of the feature vector attributed to each component of the feature vector, said image feature extractor comprises;

a feature vector extraction means for extracting the feature vector from the pattern image;

a quality index extraction means for extracting quality index information of the pattern image;

an error distribution information storing means wherein error distribution information is prepared, the error distribution information representing correlation between error distribution of a plurality of feature vectors extracted by the feature vector extraction means and the quality index information extracted from the quality index extraction means corresponding to the plurality of feature vectors; and a confidence attribution means for obtaining confidence estimation information referring to the error distribution information prepared in the error distribution information storing means by way of the quality index information extracted from the pattern image by the quality index extraction means.

An image feature analyzer of the invention for obtaining the error distribution information to be prepared in the error distribution information storing means comprises:

a feature vector extraction means for extracting the plurality of feature vectors from pattern images;

a quality index extraction means for extracting the quality index information from the pattern images; and a error distribution information analyzing means for calculating the error distribution information from distribution among each feature vector set of the plurality of feature vectors and a value of the quality index information of each feature vector belonging to the each feature vector set, said each feature vector set comprising feature vectors extracted more than one pattern images of a same pattern.

An image feature matching system of the invention for collating a pattern image making use of the feature information data set of the pattern image comprises:

a database section wherein the feature information data set of each of a plurality of pattern images is registered; and a matching section for collating the pattern image by discriminating accordance/discordance of the feature information data set of the pattern image to each of the feature information data set registered in the database section according to distance between two feature vectors each included in respective feature information data set calculated in consideration of the confidence information of the two feature vectors.

Therefor, a high-speed and a high-precision image pattern matching verification is realized by the image matching system of the invention.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings:

FIG. 3 is a block diagram illustrating a configuration of the quality index extraction means 106 according to the example for obtaining the quality index from the confidence of ridge direction;

FIG. 4 is a schematic diagram illustrating data table prepared in the error distribution information storing means 105;

FIG. 5 is a block diagram illustrating a first embodiment of the skin pattern feature analyzer according to the invention;

FIG. 9 is a block digram illustrating a quality index extraction means 90 according to the second embodiments;

FIG. 10 is a flowchart illustrating processes performed in the quality index extraction means 90 of FIG. 9;

FIG. 11 is a schematic diagram illustrating 1-dimensional error distribution table applied to the second embodiments;

DETAILED DESCRIPTION OF THE PREFERRED EMBODIMENTS

Now, embodiments of the present invention are described in connection with the drawings. The description will be made in connection with a skin pattern feature extractor, a skin pattern feature analyzer and a skin pattern matching system applied to personal identification as representative examples of the embodiments, namely, an image feature extractor, an image feature analyzer and an image matching system, as previously premised.

In the following paragraphs some embodiments of the skin pattern matching system and the skin pattern feature analyzer are described. As to the skin pattern extractor, it is described as a section, a feature extraction section, of the skin pattern matching system, since the skin pattern feature extractor is to be used as an element of the skin pattern matching system.

First Embodiment of the Skin Pattern Matching System

Figure 1:
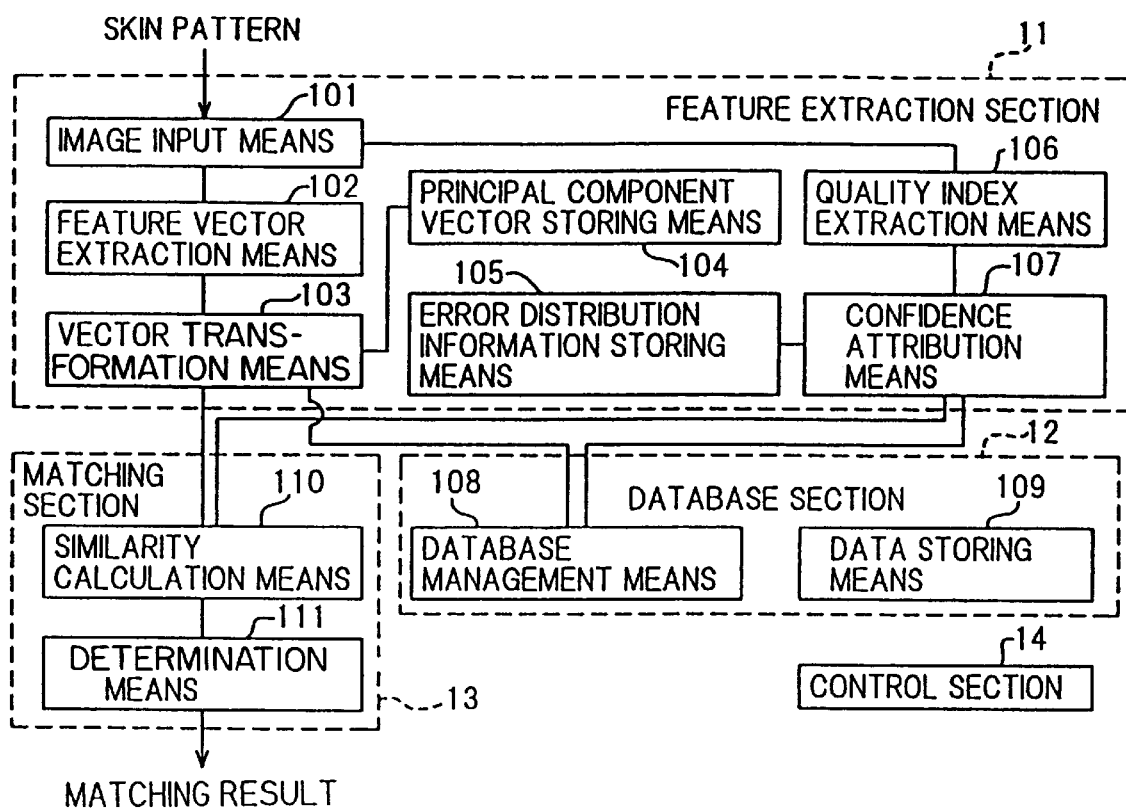
FIG. 1 is a block diagram illustration a first embodiment of the skin pattern matching system according to the present invention.

FIG. 1 is a block diagram illustration a first embodiment of the skin pattern matching system according to the present invention.

Referring to FIG. 1, the skin pattern matching system of the first embodiment has a feature extraction section 11 for extracting feature data from a skin pattern image, a database section 12 for managing a database storing the feature data extracted by the feature extraction section 11, a matching section 13 for performing matching verification of feature data extracted by the feature extraction 11 of an image to feature data registered in the database section 12, and a control section 14 for controlling each element of the skin pattern matching system. (Here, in the drawings, control lines connecting the control section 14 with each element is not depicted for simplification.) The feature extraction section 11 corresponds to the skin pattern feature extractor to be claimed.

The feature extraction section 11 comprises:

an image input means 101 where image data of a skin pattern such as a fingerprint or a palm print are input, a feature vector extraction means 102 for extracting a feature vector from image data input through the image input means 101, a vector transfer means 103 for generating feature information by performing the KLT of the feature vector extracted by the feature vector extraction means 102, a principal component vector storing means 104 wherein principle component vectors corresponding to feature values of the feature vectors are prepared to be used for the KLM performed in the vector transfer means 103, an error distribution information storing means 105 wherein is prepared error distribution information representing correlation between the features values and quality indexes, a quality index extraction means 106 for extracting a quality index of the image data input through the image input means 101, and a confidence attribution means 107 for attributing confidence information to the feature information generated by the vector transfer means 103 according to the quality index extracted by the quality index extraction means 106 referring to the error distribution information prepared in the error distribution information storing means 105.

The feature information generated by the vector transfer means 103 and the confidence information attributed thereto by the confidence attribution means 107 are the feature data extracted of the image data to be output from the feature extraction section 11.

The database section 12 comprises;

- a data storing means 109 wherein a plurality of feature data sets extracted by the feature extraction section 11 are registered, and
- a database management means 108 taking charge of reference or registration of the plurality of feature data sets in the data storing means 109.

The matching section 13, which performs the skin pattern matching verification for outputting matching results, comprises:

- a similarity calculation means 110 for calculating a similarity of the feature data supplied from the feature extraction means 11 to each of the plurality of feature data sets registered in the database section 12, and
- a determination means 111 for determining accordance/discordance from the similarity calculated by the similarity calculation means 110.

Now, operation of the skin pattern matching system of FIG. 1 is described along with an example wherein the skin pattern matching system is applied to a fingerprint matching verification.

First, procedure in the feature extraction section 11 is described.

The image input means 101 obtains digital 2-dimensional image data of a fingerprint pattern by way of a scanner, a CCD (Charge Coupled Device) camera or the like. It may be configured to obtain the fingerprint image data through a public network from a remote terminal. Here, the fingerprint image data are assumed to be image data having 512×512 binary pixels taken with a resolution of 500 DPI (Dots Par Inch).

The feature vector extraction means 102 extracts a feature vector from the fingerprint image data input through the image input means 101. There can be considered various features to be extracted for the feature vector, beginning with the ridge direction, the ridge line pitch and so on. In this example, focusing on the ridge direction feature, the feature vector is described to be extracted making use of an "Apparatus for determining ridge line direction patterns" disclosed in a Japanese patent application laid open as a Provisional Publication No. 7097/'96.

Here, the fingerprint image data input by the image input means 101 are represented as f(x,y), x and y being horizontal and vertical coordinates thereof having integer values from 1 to 512. With the apparatus of the Provisional Publication No. 7097/'96, a ridge direction θ(C) having a 0≦θ(C)<π can be extracted for each sub-region C defined in the image data f(x,y). In an example, 256 sub-regions C (C=1, 2, ..., 256) are defined horizontally and vertically at every 32 pixels in a set of image data of 512×512 pixels.

Figure 2:
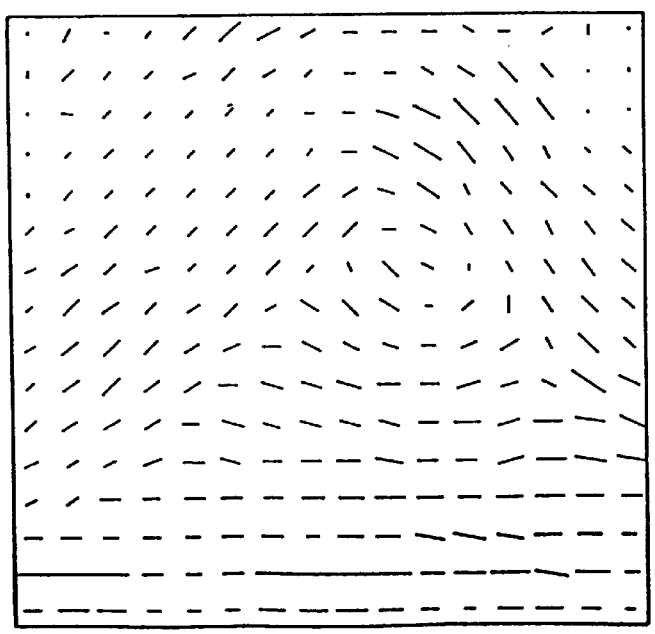
FIG. 2 is a pattern chart illustrating an example of a set of the ridge directions.

FIG. 2 is a pattern chart illustrating an example of a set of the ridge directions thus extracted, wherein the ridge direction and its confidence of each sub-region are represented by direction and length of each corresponding segment, respectively. When the ridge direction is expressed by such an angle value from 0 to π as in the Provisional Publication No. 7097/'95, a discontinuity arises between θ=π and θ=0, which is inconvenient for the feature vector. Therefore, the ridge direction θ(C) is converted into vector components $u_x(C)$ and $u_x(C)$ according to following equations.

$$u_x(C)=cos(2\theta(C)) \quad (20)$$

$$u_y(C)=sin(2\theta(C)) \quad (21)$$

Thus, a following feature vector u having 512 dimensions consisting of the vector components $u_x(C)$ and $u_y(C)$ of every sub-region C is output from the feature vector extraction means 102 of FIG. 1.

$$u = \begin{pmatrix} u_x(1) \\ u_x(2) \\ \vdots \\ u_x(256) \\ u_y(1) \\ u_y(2) \\ \vdots \\ u_y(256) \end{pmatrix} \quad (22)$$

The vector transfer means 103 performs the KLM of the feature vector u extracted by the feature vector extraction means 102 according to principal component vectors prepared in the principal component vector storing means 104. As for the principal component vectors, outputs of a first embodiment (which will be described afterwards) of the skin pattern feature analyzer may be prepared in the principal component vector storing means 104, for example. Here, consider there are prepared L principal component vectors $\Psi_i$(i=1, 2, ..., L). Each of the principal component vectors $\Psi_i$ has the same dimensions with the feature vectors u and expressed as a column vector.

The vector transfer means 103 calculates the KLT of the feature vector u for each i-th of the L principal component vectors $\Psi_i$ according to following equation from the feature vector u and the principal component vector $\Psi_i$.

$$v_i = \Psi_i^t u \quad (23)$$

Thus, a following condensed feature vector v is obtained from the source feature vector u through the KLT.

$$v = \begin{pmatrix} v_1 \\ v_2 \\ \vdots \\ v_L \end{pmatrix} \quad (24)$$

As will be described in connection to the first embodiment of the skin pattern feature analyzer, sufficient precision can be attained with a small number (five, for example) of principal component vectors, which defines the dimension number L of the condensed feature vector. The condensed feature vectors of five dimensions enables to reduce data amount into about 1/100 of the source feature vector having 512 dimensions of ridge direction features.

In case where a mean vector $\bar{u}$ is already prepared by calculating means value of the plurality of sample feature vectors u, the previous described equation (3) may be applied instead of above equation (23) for performing the KLT of the source feature vector u.

The quality index extraction means 106 extracts the quality index through following procedure.

The quality index may be represented by any data, provided that the data have correlation with errors included in the feature vector u. Here, calculation of the quality index making use of the confidence value discussed also in the prior apparatus of the Provisional Publication No. 7097/'96 is described by way of example, which is obtained along with determining the ridge direction.

FIG. 3 is a block diagram illustrating a configuration of the quality index extraction means 106 according to the example for obtaining the quality index from the confidence of ridge direction.

The quality index extraction means 106 comprises a ridge direction confidence extraction means 301 for extracting the ridge direction confidence from input image data 31, a second principal component vector storing means 302 for storing principal component vectors, and a data conversion means 303 for generating quality index data 32 from the ridge direction confidence extracted by the ridge direction confidence extraction means 301 and the principal component vectors stored in the principal component vector storing means 302.

The ridge direction confidence extraction means 301 calculates a confidence value q(C) of ridge direction θ(C) of each sub-region, making use of eigenvalues of variance-covariance matrix of a gradient vector of concerning sub-region C in the same way as disclosed in the Provisional Publication No. 7079/'96. As beforehand premised, the quality index may be calculated in another way, and complicated description is omitted, here. Furthermore, the prior apparatus of the Provisional Publication No. 7079/'96 outputs the confidence value q(C) together with the ridge direction Q(C). Therefore, the feature vector extraction means 102 of FIG. 1 may be included in the ridge direction confidence extraction means 301.

In the second principal component vector storing means 302, the same L principal component vectors with those stored in the principal component vector storing means 104 are prepared. Hence, the principal component vector storing means 104 in the feature extraction section 11 may be commonly referred to by the data conversion means 303 instead of the second principal component vector storing means 302.

The data conversion means 303 calculates quality index values $Q_i$ from the confidence value q(C) and the principal component vectors $\Psi_i$ according to following equation.

$$Q_i = \sqrt{\sum_C q(C)^2 \Psi_i(C)^2} \tag{25}$$

Here, $\Psi_i(C)$ represents C-th component of i-th principal component vector $\Psi_i$.

Thus, L quality index values $Q_i$ corresponding to L principal component vectors $\Psi_i$ are calculated for a set of image data 31. As the quality index data 32, the data conversion means 106 outputs a following quality vector Q consisting of the L quality index values $Q_i$ as its components.

$$Q = \begin{pmatrix} Q_1 \\ Q_2 \\ \vdots \\ Q_L \end{pmatrix} \tag{26}$$

In the error distribution information storing means 105, error distribution information, which is also calculated by the first embodiment, for example, of the skin pattern feature analyzer to be described afterwards, is prepared. In the first embodiment, a standard deviation $\sigma(v_i;Q_i)$ of each component $v_i$ of a condensed feature vector v is calculated when a corresponding component $Q_i$ of the quality vector Q, corresponding to the condensed feature vector v, is given.

FIG. 4 is a schematic diagram illustrating data table prepared in the error distribution information storing means 105.

Referring to the data table in the error distribution information storing means 105, the confidence attribution means 107 outputs a following confidence vector σ by calculating a standard deviation value corresponding to the quality vector Q supplied from the quality index extraction means 106. For example, when a first component $Q_1$ of the quality vector Q has a value in a range $\alpha_i \leq Q_i < \alpha_2$, the data table of FIG. 4 is retrieved and a standard deviation value $\sigma_{1,2}$ is output. In the same way, a certain standard deviation value, denoted by $\sigma_i$, is output for every quality component $Q_i$. Thus, a following confidence vector σ is obtained from the confidence attribution means 107.

$$\sigma = \begin{pmatrix} \sigma_1 \\ \sigma_2 \\ \vdots \\ \sigma_L \end{pmatrix} \tag{27}$$

Secondly, procedure performed in the database section 12 is described.

The database section 12 takes charge of data recording controlled by the control section 14 or data reading to be delivered to the matching section 13 upon referring request.

Controlled by the control section 14, the database management means 108 registers the feature vector v and corresponding confidence vector σ in the data storing means 109 together with data management information thereof such as data ID (IDentification).

As for the data storing means 109, a semiconductor memory such as a DRAM (Dynamic Random Access Memory) and data recording media such as a hard disk device are used.

In conventional fingerprint matching systems, it has been hardly possible to prepare all the necessary data in a DRAM in economical view, because of their enormous data amount. (According to a method described in "Automated Fingerprint Identification by Minuita-Network Feature—Matching Processes—" by Asai et al., the transactions of IEICE D-II, Vol. J72-D-II, No. 5 pp. 733–740, 1989, for example data for one finger amount up to 1000 bytes.) Further, even if the necessary data may be deployed in a DRAM for high-speed processing, data transfer of large amount of data would have become another bottleneck in most case.

However, according to the skin pattern matching system of the embodiment, or the present invention, the condensed feature vector v and the confidence vector σ do not amount but only to 10 bytes par finger even when five dimensions of one byte are considered for each vector. Therefore, a data storage of 100M bytes becomes sufficient for storing data of 10 million ($10^7$) fingerprints, enabling to deploy all the necessary data in a high-speed accessible semiconductor memory, a DRAM, in the data storing means 109. The hard disk is used here in parallel to backup the DRAM against incidents. A semiconductor disk, namely, a nonvolatile memory such as a flash memory, may be applied instead of the combination of the DRAM and the hard disk device.

When registered data are referred to, the database management means 108 sends each pair of the condenced feature vector v and the confidence vector σ to the matching section 13.

Now thirdly, procedure in the matching section 13 is described.

Controlled by the control section 14, the matching section 13 determines accordance/discordance of the data sent from the feature extraction section 11 to each data set delivered from the database section 12, and outputs data management information such as the data ID of data sets regarded to have accordance with the data sent from the feature extraction means 11, as follows.

The similarity calculation means 110 calculates a similarity of a pair of the feature vector and the confidence vector sent from the feature extraction means 11 to those delivered from the database section 12. In the following paragraphs, the feature vector and the confidence vector from the feature extraction section are denoted as $v^s$ and $\sigma^s$, respectively, while those from the database section are denoted as $v^f$ and $\sigma^f$, respectively. The similarity $z(v^s, v^f, \sigma^s, \sigma^f)$ is calculated according to following equation.

$$z(v^s, v^f, \sigma^s, \sigma^f) = \sum_{i=1}^{L} \left( \frac{1}{\sigma_{i,\alpha}^2} - \frac{1}{\sigma_{i,\beta}^2} \right) \frac{(v_i^s - v_i^f)^2}{\sigma_i^f \sigma_i^s} \quad (28)$$

Here, $v_i^s$ and $v_i^f$ represent respective components of the feature vectors $v^s$ and $v^f$ and $\sigma_i^s$ and $\sigma_i^f$ represent respective component of the confidence vector $\sigma^s$ and $\sigma^f$.

The similarity $z(v^s, v^f, \sigma^s, \sigma^f)$ is a scale of likeness and the smaller the similarity, the better the two feature vectors resemble.

The similarity calculation means 110 may calculate the similarity as follows instead of above equation.

$$z(v^s, v^f, \sigma^s, \sigma^f) = \sum_{i=1}^{L} \left( \frac{1}{\sigma_{i,\alpha}} - \frac{1}{\sigma_{i,\beta}} \right) \frac{|v_i^s - v_i^f|}{\sqrt{\sigma_i^f \sigma_i^s}} \quad (29)$$

When calculating the similarity according to equation (29), computational time can be reduced by beforehand preparing inverse square root, $1/\sigma^{1/2}$, of each element of both the matching confidence vector $\sigma$ (from the feature extraction section) and the reference confidence vector $\sigma$ (from the database section 12). Equation (29) defines a distance when the error distribution function accords to Laplace distribution (according to a distribution function $f(x)=k \exp(-\alpha|x|)$). The dual-exponential distribution is sometimes applied for estimating errors including certain amount of singular noises, and the equation (29) gives better discrimination results than the equation (28) when low grade images are treated.

Returning to the above equations, $\sigma_{i,\alpha}$ and $\sigma_{i,\beta}$ are both parameters whereof values are predetermined. For determining the parameter values, following example is an easy way to calculate them.

That is, preparing K (10 thousands, for example,) pairs of different fingerprint images, each pair taken from each of K different fingerprints, the feature vector v and the confidence vector $\sigma$ of each image are calculated by the feature extraction section 11. Denoting respective vectors of a j-th pair by $v^{f,j}, \sigma^{f,j}$ and $v^{s,j}$ (j=1, 2, ..., K), the parameters $\sigma_{i,\alpha}$ and $\sigma_{i,\beta}$ are calculated as follows.

$$d_i^{j,k} = \frac{|v_i^{f,j} - v_i^{s,k}|}{\sigma_i^{f,j} \sigma_i^{s,k}} \quad (30)$$

-continued $$\sigma_{i,\alpha} = \sqrt{\frac{1}{K-1} \sum_{j=1}^{K} \left( d_i^{j,j} - \sum_{k=1}^{K} d_i^{k,k} \right)^2} \quad (31)$$

$$\sigma_{i,\beta} = \sqrt{\frac{1}{K-1} \sum_{j=1}^{K} \sum_{k=1}^{K} \left( d_i^{j,k} - \sum_{l=1}^{K} \sum_{m=1}^{K} d_i^{l,m} \right)^2} \quad (32)$$

The determination means 111 selects and outputs information of the data which can be regarded to be coincide with the data supplied from the feature extraction means 11 among those registered in the database section 12.

In the accumulation calculation performed according to the equation (28) or (29) by the similarity calculation means 110, the calculation may be finished determining there is no coincidence when the distance accumulation attains to a certain threshold value.

Thus, a fingerprint matching verification is performed in the skin pattern matching system of of the embodiment.

First Embodiment of the Skin Pattern Feature Analyzer

Now, the skin pattern feature analyzer is described.

FIG. 5 is a block diagram illustrating a first embodiment of the skin pattern feature analyzer according to the invention.

The skin pattern feature analyzer is used for analyzing distribution information among feature vectors extracted from a data set of skin patterns images, and outputs principal component vectors of the feature vector distribution and error distribution information representing error correlation between the quality indexes and the feature vectors.

Referring to FIG. 5, the skin pattern feature analyzer 51 of the first embodiment comprises;

a feature vector extraction means 501 for extracting a feature vector from a skin pattern image, a principal component vector calculation means 502 for calculating principal component vectors of data distribution of the skin patter images represented by the feature vectors extracted by the feature vector extraction means 510, a principal component vector storing means 503 for storing principal component vectors obtained by the principal component vector extraction means 502, a vector transfer means 504 for obtaining condensed feature vectors by performing the KLT of feature vectors extracted by the feature vector extraction means 501, a quality index extraction means 505 for extracting a quality index of the skin pattern images, and an error distribution information analyzing means 506 for analyzing correlation between error distribution of the quality index information delivered from the quality index extraction means 505 and that of the condensed feature vectors transferred by the vector transfer means 505.

Figure 6:
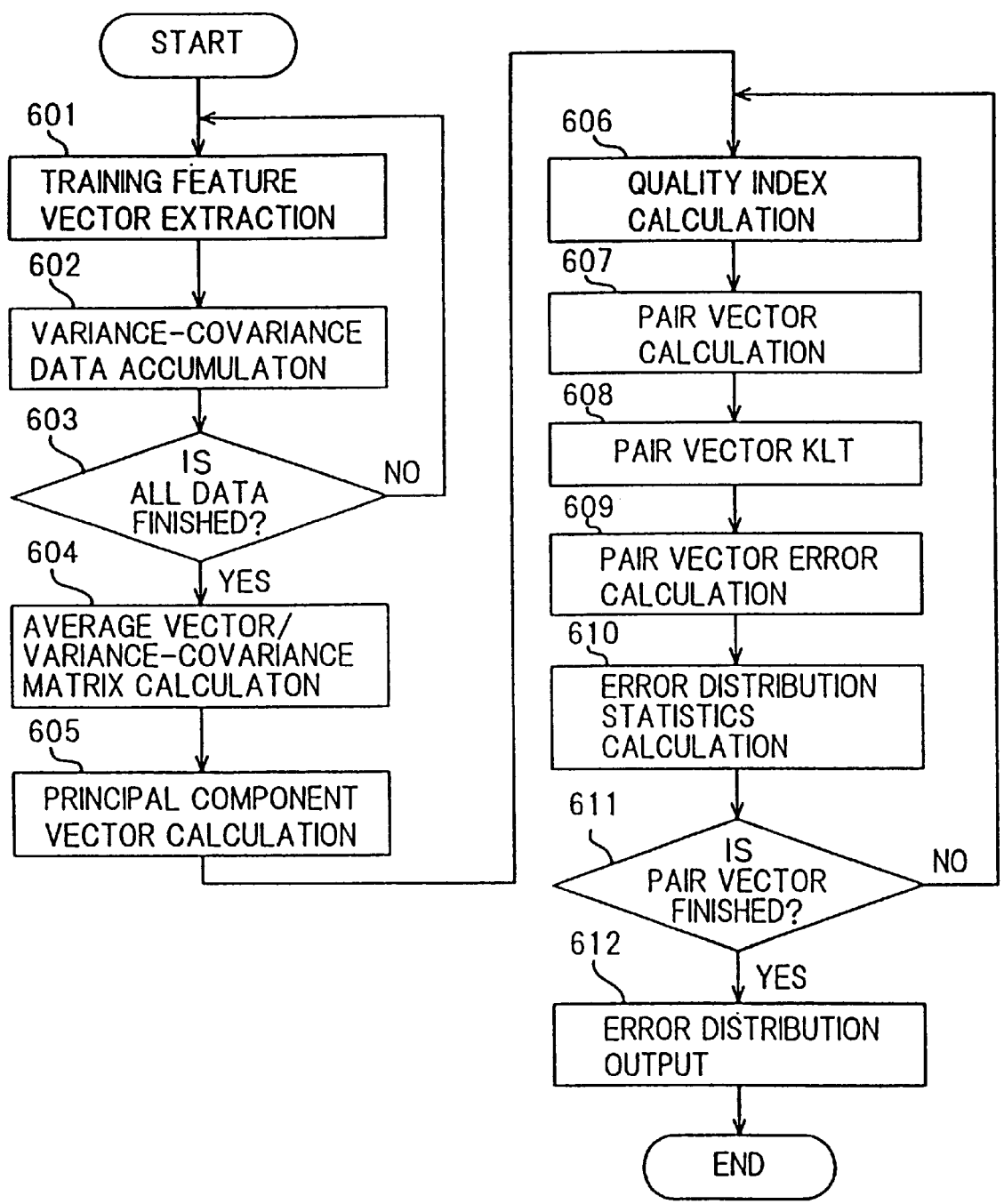
FIG. 6 is a flowchart illustrating processes performed in the skin pattern feature analyzer 51 of FIG. 5.

FIG. 6 is a flowchart illustrating processes performed in the skin pattern feature analyzer 51 of FIG. 5, comprising a training feature vector extraction step 601, a variance-covariance matrix data accumulation step 602, a data finish determination step 603, an average vector/variance-covariance matrix calculation step 604, principal component vector calculation step 605, a quality index calculation step 606, a pair vector extraction step 607, a pair vector KLT step 608, a pair vector error calculation step 609, an error distribution statistics calculation step 610, a pair vector finish determination step 611, and an error distribution output step 612.

Now, operation of the embodiment is described, along with processes performed for preparing the principal component vectors to be used in the principal component vector storing means 104 and the error distribution information to be used in the error distribution information storing means 105 of FIG. 1, by way of example.

A data set of skin pattern images should be beforehand prepared for obtaining the principal component vectors and the error distribution information to be used for the skin pattern matching system of the invention. Here also, a data set of fingerprint images are described to be prepared, by way of example, for obtaining above data concerning fingerprints to be used for the skin pattern matching system of FIG. 1.

The data set is assumed to comprise data of N pairs (total 2N) of different images of N fingerprints. The better, the more number of pairs are applied for obtaining the error distribution information, but pairs more than 10 thousands give comparatively good results. The data set may be gathered by way of an image input device such an image scanner as mentioned in connection with the first embodiment of the skin pattern matching system. However, a fingerprint database published by US National Institute of Standards and Technology (hereinafter abbreviated as NIST), the NIST Special Database 14, for example, is available. For cutting out image data of 512×512 pixels from those of the NIST database, image center thereof should be detected, whereof a method is disclosed in a Japanese patent published as a specification No. 271884/89, for example.

Returning to FIG. 6, extraction of the principal component vectors (steps 601 to 605) is described firstly.

At steps 601 to 606, 2N feature vectors are extracted from the data set of 2N fingerprint images, a variance-covariance matrix of distribution of the 2N feature vectors is calculated, and the principal component vectors are obtained from the variance-covariance matrix.

As for obtaining the principal component vectors themselves, it is not necessary to prepare data set of paired fingerprint images. However, it is economical to use the same data set for obtaining both the principal component vectors and the error distribution information. Therefore, the principal component vector calculation is described to be performed with the 2N fingerprint images, in the following paragraphs.

The feature vector extraction means 501 extracts M (512 in the example) dimensional feature vectors $u_i$ (i=1, 2, . . . , 2N), each represented by equation (22), from the data set of 2N fingerprint images (at step 601), in the same way as the feature vector extraction means 102 of FIG. 1.

The principal component vector extraction means 503 calculates statistic data of the extracted feature vectors $u_i$ for obtaining a variance-covariance matrix V thereof represented by equation (1).

For calculating the variance-covariance matrix V directly according to equation (1), an average vector $\bar{u}$ should be calculated first by accumulating each of 2N of $u_i$, and then the variance-covariance matrix V should be calculated by referring to each $u_i$ according to equation (1). Therefore, all 2N of $u_i$ must be retained in a memory, or the feature vectors $u_i$ should be extracted twice for each operation.

By this reason, the principal component vector calculation means 502 of the embodiment calculates the variance-covariance matrix V according to following equation (34).

$$V = \frac{1}{2N-1} \sum_{i=1}^{2N} (u_i - \bar{u})(u_i - \bar{u})^t \tag{33}$$

$$= \frac{1}{2N-1} \sum_{i=1}^{2N} u_i u_i^t - \overline{uu^t} \tag{34}$$

$$\bar{u} = \frac{1}{2N} \sum_{i=1}^{2N} u_i \tag{35}$$

That is, an accumulation of the M dimensional feature vectors $u_i$ for obtaining the mean vector $\bar{u}$, and another accumulation of M×M matrix $u_i u_j^t$ for obtaining first term $$\frac{1}{2N-1} \sum_{i=1}^{2N} u_i u_i^t$$

of left side of the above equation (34) are sufficient to be calculated at step 602. These accumulations can be accomplished each time when an individual feature vector $u_i$ is extracted. Therefore, it is not necessary to retain all the feature vectors $u_i$ at the same time or to extract them twice.

After the steps 601 and 602 are repeated for the data set of every of the fingerprint images (determined at step 603), the principal component vector calculation means 502 calculates (at step 604) second term of left side of the equation (34) from the mean vector $\bar{u}$ thus accumulated, for obtaining the variance-covariance matrix V.

Then, (at step 605) the principal component vector calculation means 502 calculates the principal component vectors by way of principal component analysis of distribution of the feature vectors $u_i$ with its variance-covariance matrix V obtained at step 604. The principal component analysis is well known and briefly described in the previous paper of C. L. Wilson et al. An explanation thereof can be also found in pp. 40–42 of the "Handbook of Image Analysis" previously referred to.

M principal component vectors $\psi_i$ (i=1, 2, . . . , M; called a first, a second, . . . , an M-th principal component vector, in order of sizes of corresponding eigenvalues) are obtained from a variance-covariance matrix V of M×M dimensions. Upper several principal component vectors among them are sufficient to be used for the KLM. An appropriate employment number may be determined experimentally by performing the matching verification experimentally using feature vectors actually processed through the KLM. In the case of the fingerprint image, upper two principal component vectors have conspicuously good characteristic. Hence, upper 5 to 6 principal component vectors corresponding to largest eigenvalues are sufficient to be applied. Here, L principal component vectors are assumed to be selected.

Returning to FIGS. 5 and 6, the principal component vector calculation means 502 stores the L principal component vectors $\psi_l$ (l=1, 2, . . . , L) in the principal component vector storing means 503.

Thus, extraction of the L principal component vectors $\psi_l$ is performed.

Then, the error distribution analysis is described referring to steps 606 to 612 of FIG. 6.

In the error distribution analysis, correlation between the error distribution and the quality index of paired condensed feature vectors, obtained from a data set of paired images and processed through the KLT, is calculated. As beforehand premised, the error distribution analysis will be described to use the same data set of N pairs of fingerprint images used to obtain the principal component vectors $\psi_l$. However, it may be performed with another data set of sufficient number of paired and different fingerprint images, each pair thereof taken from a same finger.

At steps 606 to 611, error distribution information is obtained from the quality indexes and the condensed feature vectors of the paired fingerprint image data.

The quality index extraction means 505 calculates (at step 606) a quality vector $Q_{i,j}$ (i=1, 2, . . . , N; j=1, 2) of each (j=1, 2) of i-th pair of images in the same way as described in connection with the skin pattern matching system of FIG. 1, according to following equations.

$$Q_{i,j} = \begin{pmatrix} Q_{i,j,1} \\ Q_{i,j,2} \\ \ldots \\ Q_{i,j,l} \\ \ldots \\ Q_{i,j,L} \end{pmatrix} \quad (36)$$

$$Q_{i,j,l} = \sqrt{\sum_C q_{i,j,l}(C)^2 \Psi_l(C)^2} \quad (37)$$

Here, $q_{i,j,l}(C)$ and $\psi_l(C)$ (l=1, 2, . . . , L) are C-th components of the ridge direction confidence vector and that of the principal component vector to be used for the KLT, respectively, as described in connection with equation (25). The quality vectors $Q_{i,j}$ thus calculated are supplied to the error distribution information analyzing means 506.

On the other hand, the feature vector extraction means 501 extracts (at step 607) feature vectors $u_{i,j}$ (i=1, 2, . . . , N; j=1, 2) from image data of i-th fingerprint.

The vector transfer means 504 performs the KLT of the paired feature vector $u_{i,j}$ (at step 608), that is, performs the KLT according to following equation (38) making use of L principal component vectors $\psi_l$ to obtain paired condensed feature vectors $v_{i,j}$.

$$v_{i,j,l} = \psi_l^t u_{i,j} \quad (38)$$

$$v_{i,j} = \begin{pmatrix} v_{i,j,1} \\ v_{i,j,2} \\ \ldots \\ v_{i,j,l} \\ \ldots \\ v_{i,j,L} \end{pmatrix} \quad (39)$$

The paired condensed feature vectors $v_{i,j}$ thus obtained are also supplied to the error distribution information analyzing means 506.

The error distribution information analyzing means 506 analyzes correlation between the quality index and the error distribution referring to quality vectors $Q_{i,j}$ delivered from the quality index extraction means 505 and the condensed feature vectors $v_{i,j}$ delivered from the vector transfer means 504, and prepares a lookup table, or an error distribution table, representing relation between standard deviation of error values to quality index such as illustrated in FIG. 4 concerning each dimension of these vectors having the same L dimensions. More concretely, each time when a pair of condensed feature vectors $v_{i,j}$ and corresponding pair of quality vectors $Q_{i,j}$ are delivered, the error distribution information analyzing means 506 registers error value of of each component of the condensed feature vectors into a corresponding table entry prepared for each dimension according to ranks k of the quantized quality index value (at step 609), for calculating standard deviation $\sigma_{k,l}$ of the error values for each rank k of each dimension l according to following equations, said error value being deviation of each of components of the condensed feature vectors $V_{i,j}$ from their mean value.

$$\sigma_{k,l} = \sqrt{\frac{1}{N_{k,l}-1} \sum_{Q_{i,j,l} \in k} (v_{i,j,l} - \bar{v}_{i,l})^2} \quad (40)$$

where $N_{k,l} = \sum_{Q_{i,j,l} \in k} 1$, $\bar{v}_{i,l} = \frac{1}{\sum_j l} \sum_j v_{i,j,l}$, and $$\sigma_{k,l} = \sqrt{\frac{1}{4(N_{k,l}-1)} \sum_{Q_{i,j,l} \in k} (v_{i,1,l} - \bar{v}_{i,2,l})^2} \quad (41)$$

when $j = 1, 2$.

Here, $N_{k,l}$ is a number of data classified into each table entry, and first summation $\Sigma Q_{i,j,l} \in k$ means a summation of concerning data corresponding to quality index value $Q_{i,j,l}$ to be quantized into k-th rank. The error value as above defined in equation (40) becomes difference between corresponding components of each pair of the condensed feature vectors obtained from the same fingerprint, when the data set is composed of paired (only two) image data. When more than two images from one fingerprint can be obtained, more precise mean value estimation, and hence, error value estimation can be obtained. Therefore, the more images are the more preferable.

In the embodiment of FIG. 5, the error distribution information analyzing means 506 operates as follows.

In advance, threshold values for quantizing each component of the quality vectors $Q_{i,j}$ are determined according to distribution of the quality vectors $Q_{i,j}$. When value range of a dimension of the quality vector $Q_{i,j}$ is from $Q_{min}$ to $Q_{max}$, each of the threshold values $\alpha_1, \alpha_2, \ldots, \alpha_{n-1}$ is determined so as to quantize the value range into n ranks, 256, for example. Corresponding to each rank of each dimension, an error distribution table having n×L entries is prepared.

The error distribution information analyzing means 506 compares (at step 610) each component $Q_{i,j,l}$ of a quality vector $Q_{i,l}$ to the threshold values $\alpha$; for obtaining corresponding rank $k_{1,l}$, and accumulates a square error value $(v_{i,1,l}-v_{i,2,l})^2$ of equation (41) calculating from corresponding components of corresponding pair of condensed feature vectors $v_{i,1}$ and $v_{i,2}$ onto a table entry indicated by the rank $k_{1,l}$. The same square error value $(v_{i,1,l}-v_{i,2,l})^2$ is also accumulated onto another (or the same) table entry indicated by another rank $k_{2,l}$ obtained from partner quality vector $Q_{i,2}$. Thus, square error values of all dimensions of the pair of feature vectors $v_{i,1}$ and $v_{i,2}$ are registered in the error distribution table.

After finishing registration of the square error values of all pairs of feature vectors in the data set (determined at step 611), the error distribution information analyzing means 506 outputs the standard deviation $\sigma_{k,l}$ of the error values of each table entry calculated according to equation (41) as the error distribution information (at step 612). When there is no data or only one square error value in a table entry, the equation (41) cannot be applied. In the case, a certain default value may be output, or a value interpolated from neiboring table entry may preferably output, when the quality index is quantized sufficiently fine, into 256, for example.

Thus, the principal component vectors and the error distribution information previously described to be referred to by the first embodiment of FIG. 1 of the skin pattern matching system are analyzed.

Figure 7:
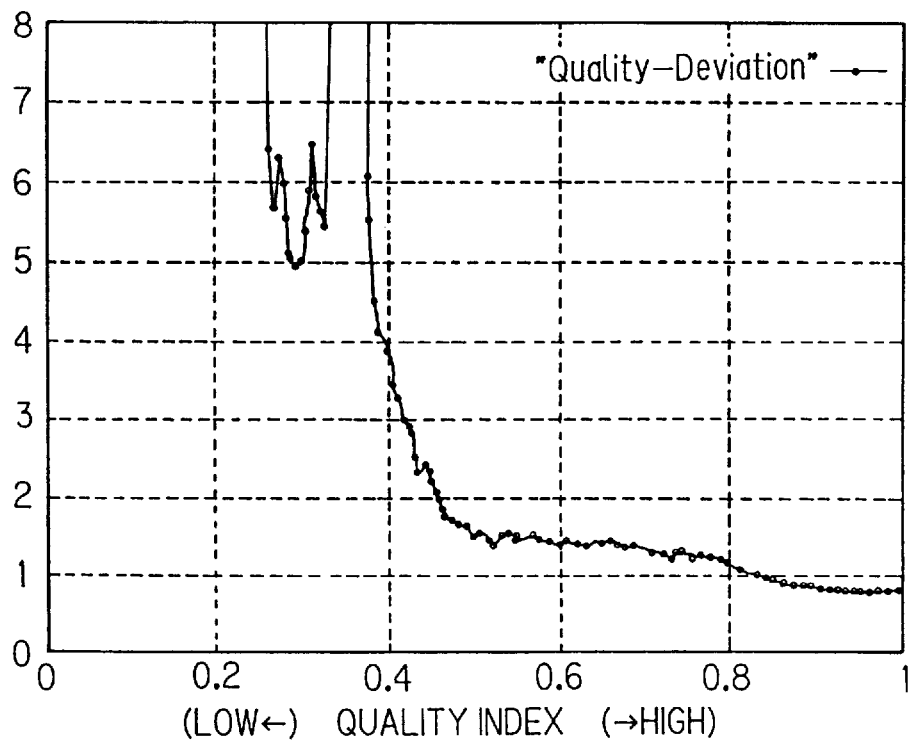
FIG. 7 is a graphic chart illustrating an analysis result of the skin pattern feature analyzer of FIG. 5.

FIG. 7 is a graphic chart illustrating an analysis result, that is, an experimental output representing standard deviation of errors of a dimension according to quality index value.

Second Embodiments of the Skin Pattern Matching System and the Skin Pattern Feature Analyzer In the foregoing paragraphs, first embodiments of the skin pattern matching system and the skin pattern feature analyzer are described, wherein eigenvalues obtained along with ridge direction extraction are used as the quality index.

In the following paragraphs, second embodiments of the skin pattern matching system and the skin pattern feature analyzer are described, wherein the quality index is calculated according to a distance of a concerning feature vector from a proper distribution of feature vectors.

First, principle of quality index measurement of the second embodiments is described.

In the second embodiments, a reference measure is relied upon a distance from a concerning feature vector to a closed space wherein feature vectors without noises are gathered. Representing the closed space by a set of sample points, a distance to a nearest sample point is defined as the quality index.

In the following paragraphs, principle of quality index extraction is described first.

Figure 8:
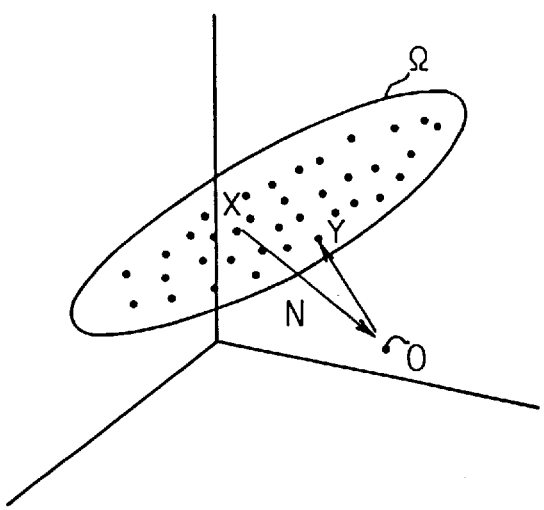
FIG. 8 is a schematic diagram illustrating a feature vector X, originally to be in the closed space Ω when there is no noise, extracted as another feature vector O.

Feature vectors obtained without noises from high-grade pattern images are localized in a certain closed part of a space having the same dimensions with those of the feature vectors. An example of the closed part is denoted by $\Omega$ in FIG. 8 illustrating a space of the dimensions. Data samples of feature vectors having high-grade quality index without noises are represented by black dots in the closed space $\Omega$.

When there are sufficient number $n_s$ of the data samples in the closed space $\Omega$, distances between neighboring feature vectors converge to zero. That is, following equation stands with any feature vector $\chi$ in the closed space $\Omega$.

$$\lim_{n_s \to \infty} \min_{y \in \Omega} \|x - y\| = 0 \tag{42}$$

Consider a feature vector X, originally to be in the closed space $\Omega$ when there is no noise, is extracted as another feature vector O of FIG. 8 from outside of the closed space $\Omega$ because of mingled noise vector N.

The quality index defined in the second embodiments is a distance from a sample point Y nearest to the concerning feature vector O, which is expressed as $\|Y-O\|$. This distance should be the same with the distance to the closed space $\Omega$ when there are sufficient number of sample points.

Hence, the distance to the closed space $\Omega$ can be approximated by obtaining a minimum value of distances to feature vectors in a database where sufficient number of feature vectors without noise are prepared.

Now, a concrete example of the second embodiments is described. In the second embodiments, following elements of FIG. 1 are modified, that is, the quality index extraction means 106 or 505, the confidence attribution means 107, the error distribution information storing means 105, and the error distribution information analyzing means 506, and other elements are left unchanged. Furthermore, in the first embodiments of FIG. 1 and FIG. 5, the quality indexes directly from image data. However, in the second embodiments, the quality index extraction means 106 or 505 is supplied with feature vectors after condensed through the KLT by the vector transfer means 103 or 505.

FIG. 9 is a block diagram illustrating a quality index extraction means 90 according to the second embodiments, comprising a database 903 wherein a plurality of feature vectors without noise and processed through the KLT are prepared, a distance calculation means 901 for calculating a distance between an input feature vector and the plurality of feature vectors prepared in the database 903, a distance revision means 902 for revising/retaining a minimum value among the distances calculated by the distance calculation means 901, and a control means 904 for controlling above elements of the quality index extraction means 90.

Now, operation of the quality index extraction means 90 of the second embodiments is described.

FIG. 10 is a flowchart illustrating processes performed in the quality index extraction means 90 of FIG. 9, comprising a feature vector distance calculation step 1001, a minimum distance revision step 1002 and a finish determination step 1003.

First, a distance, namely a similarity of an input feature vector to that in the database 903 is calculated (at step 1001).

In the database 903, the plurality of high-quality feature vectors are prepared processed through the KLT. Although the high-quality may be discriminated by way of expert's eye, it can be preferably discriminated automatically referring to standard deviation of errors among at least two feature vectors (after the KLT) taken from the same fingerprint. Sets of feature vectors obtained from the same pattern images giving the standard deviation of errors smaller than a threshold value are selected to be of the high-quality with few noises. As for the number of feature vectors, more than 10 thousands may be sufficient in the case of fingerprint.

The distance of the input feature vector is calculated according to the Euclidean distance represented by equation (4), for example.

The distance revision means 902 revises a retaining minimum value when the distance newly calculated is smaller than the retaining minimum value (at step 1002).

The control means controls the quality index extraction means 90 to repeat steps 1001 and 1002 until distance calculation of an input feature vector to all the feature vectors registered in the database 903 is finished (determined at step 1003). Thus, the distance of the input feature vector to the set of reference data can be calculated to be output as the quality index Q. In the second embodiments, the quality index Q has a scalar value, different from the quality index having vector value of the first embodiments.

The second embodiment of the skin pattern feature analyzer prepares the error distribution table making use of the quality indexes Q thus extracted by the quality index extraction means 90 from a data set having appropriate quality range. An error distribution information analyzing means similar to the error distribution information analyzing means 506 of FIG. 5 may calculate the standard deviation of the error values according to equation (40) or (41) regarding each component $Q_{i,j,l}$ has the same value $Q_{i,j}$ for each paired feature vectors $v_{i,1}$ and $v_{i,2}$.

Figure 12:
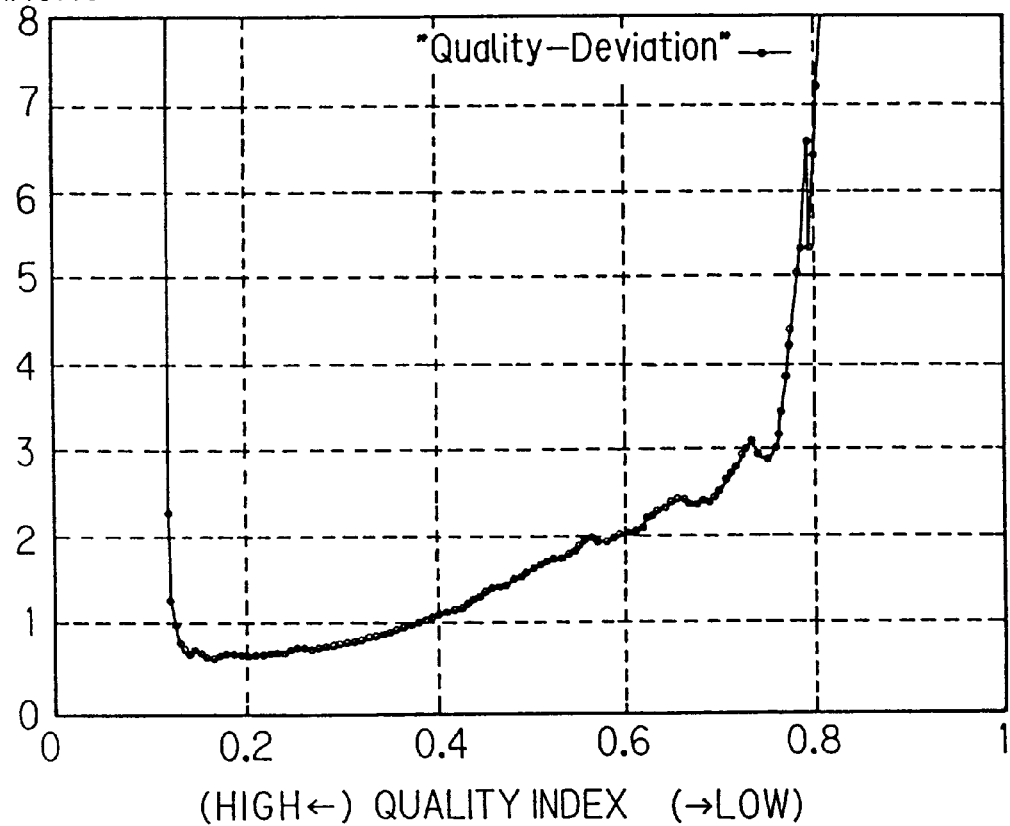
FIG. 12 is a graphic chart illustrating an experimental result of the error distribution table of FIG. 11.

Here, the error distribution table is not necessary to be a 2-dimensional as illustrated in FIG. 4. The error distribution table of the second embodiments is sufficient to be 1-dimensional as illustrated in FIG. 11. An experimental result of the error distribution table of FIG. 11 is shown as a graphic chart of FIG. 12 corresponding to that of FIG. 7.

The skin pattern matching system of the second embodiment performs skin pattern matching verification making use of the quality index Q obtained by the quality index extraction means 90. The skin pattern matching verification preformed here is described also referring to FIG. 1.

Processings performed in the quality index extraction means 106 of FIG. 1 is executed by the quality index extraction means 90 in the second embodiment, whereto condensed feature vectors processed through the KLT are input from the vector transfer means 103, instead of source feature vectors input directly from the feature extraction means 103 in the first embodiment.

In the error distribution information storing means 106, the error distribution information is registered in a 1-dimensional error distribution table.

The confidence attribution means 107 outputs the standard deviation of errors referring to the 1-dimensional error distribution table in the quality index storing means 106 by accessing thereto with the scalar quality index Q obtained from the quality index extraction means 90 corresponding to concerning feature vector v.

Other processings are performed in the same way with the first embodiment, and duplicated descriptions are omitted.

Third Embodiments of the Skin Pattern Matching System and the Skin Pattern Feature Analyzer In the following paragraphs, third embodiments of the skin pattern matching system and the skin pattern feature analyzer is described, wherein a distance of a ridge line pattern to a reference pattern is adopted as the quality index.

Figure 13:
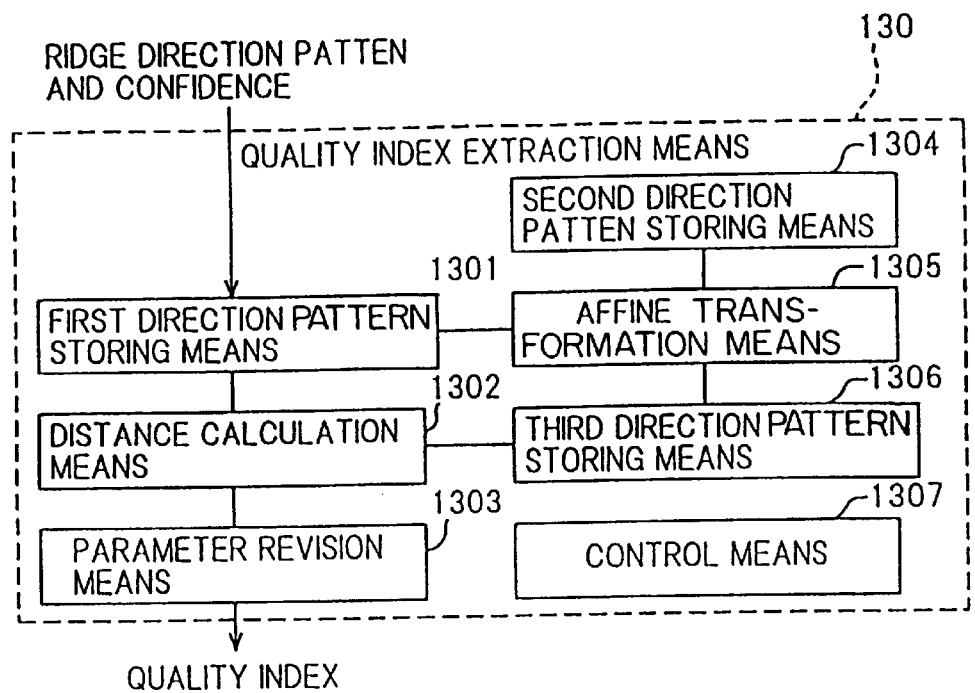
FIG. 13 is a block diagram illustrating a configuration of the quality index extraction means 130 according to the third embodiments.

FIG. 13 is a block diagram illustrating a configuration of the quality index extraction means 130 according to the third embodiments, comprising:

- a first, a second and a third direction pattern storing means 1301, 1304 and 1306,
- a distance calculation means 1302 for calculating distances between input ridge direction patterns stored in the first direction pattern storing means 1301 and affine transferred ridge direction patterns stored in the third direction pattern storing means 1306 referring to their confidences stored therewith, respectively,
- a parameter revision means 1303 for determining whether the distance calculated by the distance calculation means 1302 is the shortest or not, and memorizing affine parameters when the distance is the shortest,
- an affine transfer means 1305 for performing affine transfer of ridge direction patterns and their confidences stored in the first and the second direction pattern storing means 1301 and 1304, the obtained affine transformations being stored in the third direction pattern storing means 1306, and
- a control means 1307 for controlling operation of each element of the quality index extraction means 130 including parameter control of the affine transfer.

Figure 14:
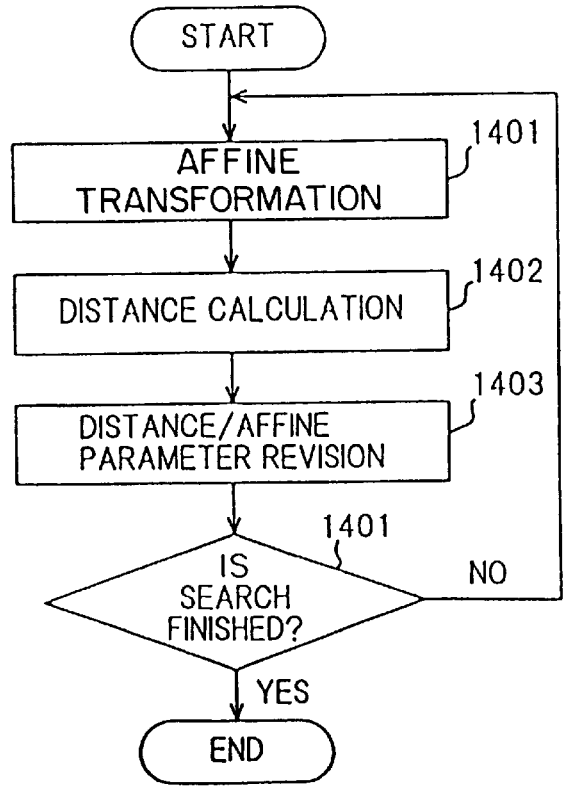
FIG. 14 is a flowchart illustrating processes performed in the quality index extraction means 130 of FIG. 13.

FIG. 14 is a flowchart illustrating processes performed in the quality index extraction means 130 of FIG. 13, comprising an affine transfer step 1401, a distance calculation step 1402, a distance/affine parameter revision step 1403, and a finish determination step 1404.

Now, referring to FIG. 14, operation of the quality index extraction means 130 of FIG. 13 according to the third embodiment is described.

Ridge direction patterns θ(C) and their confidences q(C) such as previously described in connection with the first embodiment of the skin pattern matching system are input to the first direction pattern storing means 1301. In the second direction pattern storing means 1304, reference ridge direction patterns Θ(C) and their confidences Q(C) are stored. The reference ridge direction patterns Θ(C) and their confidences Q(C) are prepared, for example, by obtaining mean values of n (10 thousands, for example) sets of ridge direction patterns $\theta_i$ (i=1, 2, . . . , n) according to following equations.

$$\Theta_x(C) = \frac{1}{n}\sum_{i=1}^{n} \cos(2\theta_i(C)) \tag{43}$$

$$\Theta_y(C) = \frac{1}{n}\sum_{i=1}^{n} \sin(2\theta_i(C)) \tag{44}$$

$$\Theta(C) = \frac{1}{2}\tan^{-1}\frac{\Theta_y(C)}{\Theta_x(C)} \tag{45}$$

$$Q(C) = \sqrt{\Theta_x(C)^2 + \Theta_y(C)^2} \tag{46}$$

The affine transfer means 1305 performs affine transfer (at step 1401) of direction patterns and their confidences of an input pattern image stored in the first direction pattern storing means 1301 using affine parameter sets each determined according to each ensemble of parallel/rotation displacement values (Δx, Δy, Δθ) in a search range.

The affine transfer is well known and described also in pp. 423–429 of the previous "Handbook of Image Analysis". Hence, detailed explanation is omitted. However, it is to be noted here, in the affine transfer of the ridge direction pattern, that component values of the ridge direction patterns θ(C) are defined relatively to the coordinate system and they are variable when the coordinate system is such rotated as in the affine transfer, deferently from ordinary affine transfer of images. Hence, for the rotation Δθ of the coordinate system, Δθ is added to each component value of the ridge direction patterns θ(C).

The obtained affine transformations are registered in the third direction pattern storing means 1306. The size of the affine transformations to be stored in the third direction pattern storing means 1306 are adjusted to be the same with the source ridge direction patterns in the first direction pattern storing means 1301. Where there is no reference point, concerning confidence is set to be null. By preparing the reference ridge direction patterns Θ(C) and their confidences Q(C) to be stored in the second direction pattern storing means 1304 to have larger sizes than ridge direction patterns of the input pattern image, parts having no reference point can be reduced and the transfer precision is improved.

As for the search range of the parallel/rotation displacement values (Δx, Δy, Δθ), it can be defined as follows, for example. When the ridge direction pattern θ(C) has a size of 16×16, as in this case, nine values −4, −3, . . . , +3, +4 are assigned for both the parallel displacements Δx and Δy, and seven values −30°, −20°, . . . , +20°, +30° for the rotation displacement Δθ. Thus, 9×9×7=567 displacement ensembles are obtained. Further, by applying the image center detection method disclosed in the Provisional Publication No. 271884/'89 beforehand mentioned, the search range can be reduced around the center of fingerprints for economizing computational time.

The distance calculation means 1302 calculate the distance D (at step 1402) according to following equation for each affine parameter set.

$$D = \frac{\sum_C q(C)^\gamma F(Q(C))^\gamma (|\theta_x(C) - F(\Theta_x(C))|^2 + |\theta_y(C) - F(\Theta_y(C))|^2)}{\sum_C q(C)^\gamma F(Q(C))^\gamma} \quad (47)$$

where, $$\theta_x(C) = \cos(2\theta(C)) \quad (48)$$

$$\theta_y(C) = \sin(2\theta(C)) \quad (49)$$

Here, F(*) represents the affine transformation of *, and γ is a parameter having a value 0.5, for example.

The parameter revision means 1303 checks whether the distance D is the shortest for a concerning input pattern image, and registers the distance and values of the affine parameter set giving the distance, when it is found to be the shortest (at step 1403).

The quality index extraction means 103 repeats steps 1401 to 1403 for each affine parameter set in the parallel/rotation displacement range calculating the distance D according to equation (47). When above repetition is finished (at step 1404) for a input pattern image, the revised minimum value of the distance D is output as the quality index.

The third embodiments of the skin pattern matching system and the skin pattern analyzer are embodied by comprising the above described quality index extraction means 130. The quality index output from the quality index extraction means 130 has a scalar value and may be treated in the same way with that obtained from the quality index extraction means 90 of FIG. 9 of the second embodiments of the invention, duplicated explanation being omitted.

Further, by performing affine transfer of each input pattern image making use of the affine parameter set giving the shortest distance thereof the input pattern image can be aligned in the coordinate system. Therefore, the affine transfer may be applied also in the first embodiments of the skin pattern matching system and the skin pattern analyzer for coordinate alignment of input data, that is, input image data or ridge direction data extracted as the feature vector.

Still further, the affine transfer is described to be performed each time with each affine parameter set in the search range of the parallel/rotation displacements. However, a database may be beforehand prepared, wherein affine transformation data of all components of the ridge direction patterns for all displacements in the search range are registered. Then, the quality index is extracted by calculating the distance to all the data registered in the database in the similar way with the quality index extraction means 90 of FIG. 9 of the second embodiments. By pre-performing such time consuming processes as the affine transfer, calculation time can be still reduced.

Fourth Embodiment of the Skin Pattern Matching System

In the fourth embodiment of the skin pattern matching system, the fingerprint matching verification is performed making use of all or some of the three quality index extraction means 505, 90 and 130 heretofore described, and commonly available parts are jointly used.

Figure 15:
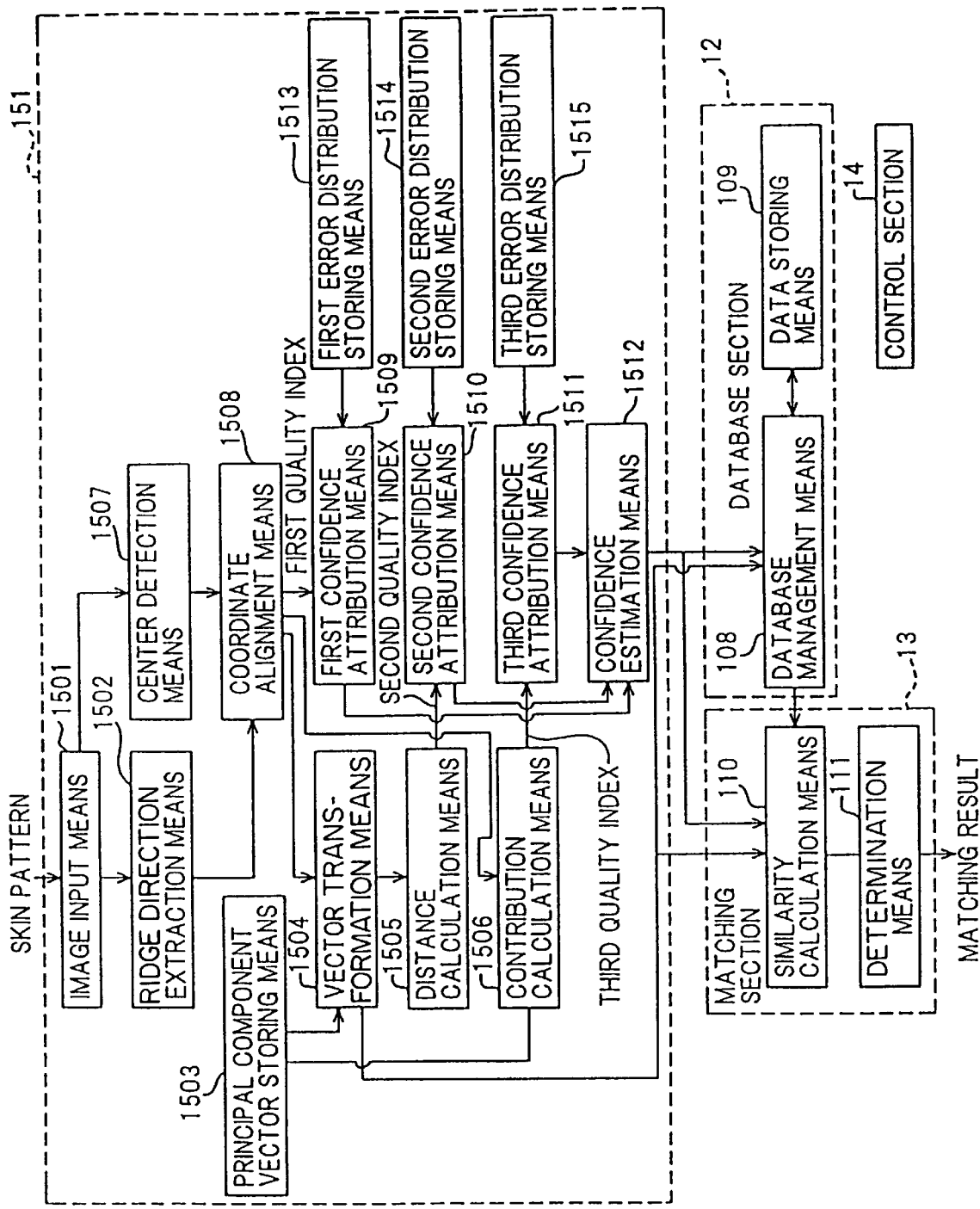
FIG. 15 is a block diagram illustrating the fourth embodiment of the skin pattern matching system of the invention.

FIG. 15 is a block diagram illustrating the fourth embodiment of the skin pattern matching system of the invention, wherein all the three quality index extraction means are applied.

Referring to FIG. 15, the skin pattern matching system of the fourth embodiment has a feature extraction section 151 for extracting feature data from skin pattern images, a database section 12 for storing and managing the feature data, a matching section 13 and a control section 14.

The database section 12, the matching section 13 and the control section 14 may have the same configuration with those of FIG. 1, and so, duplicated description is omitted.

The feature extraction section 151, which takes charge of outputting a feature vector and standard deviation of estimated errors of an input skin pattern image data, comprises;

an image input means 1501 where image data of a skin pattern such as a fingerprint or a palm print are input, a ridge direction extraction means 1502 for extracting a ridge direction pattern and its confidence from the image data input through the image input means 1501, a center detection means 1507 for detecting center of the image data input, through the image input means 1501, a coordinate alignment means 1508 for performing coordinate alignment of the ridge direction pattern and its confidence extracted by the ridge direction extraction means 1502, and for calculating a first quality index according to conformity obtained along with the coordinate alignment, a principal component vector storing means 1503 wherein are prepared principle component vectors of distribution of vectors consisting of direction patterns processed by the coordinate alignment means 1508, a vector transfer means 1504 for generating a feature vector by performing the KLT of the vector of the direction pattern processed by the coordinate alignment means 1508 making use of the principal component vectors prepared in the principal component vector storing means 1503.

a distance calculation means 1505 for obtaining a second quality index by calculating a minimum distance of the feature vector processed by the vector transfer means 1504 to a high-quality data set of feature vectors beforehand prepared, a contribution calculation means 1506 for obtaining a third quality index of each dimension of the feature vector from its confidence aligned by the coordinate alignment means 1508 and the principal component vectors, a first error distribution information storing means 1513 wherein standard deviation of errors of the feature vectors corresponding to the first quality index is prepared in a first lookup table, a second error distribution information storing means 1514 wherein standard deviation of errors of the feature vectors corresponding to the second quality index is prepared in a second lookup table, a third error distribution information storing means 1515 wherein standard deviation of errors of the feature vectors corresponding to the third quality index is prepared in a third lookup table, a first confidence attribution means 1509 for obtaining it first confidence value to be attributed to the feature vector by referring to the first lookup table accessed with the first quality index, a second confidence attribution means 1510 for obtaining a second confidence value to be attributed to the feature vector by referring to the second lookup table accessed with the second quality index, a third confidence attribution means 1511 for obtaining a third confidence value to be attributed to the feature vector by referring to the third lookup table accessed with the third quality index, and it confidence estimation means 1512 for outputting a confidence estimation of the feature vector according to the first, the second and the third confidence value.

Now, operation of the fourth embodiment of the skin pattern matching system will be described referring to FIG. 15.

Each of the above means except for the confidence estimation means 1512 can be realized by applying each corresponding means heretofore described in connection with the first to the third embodiments. Hence, these means other than the confidence estimation means 1512 are briefly described, here.

The ridge direction extraction means 1502 extracts the ridge direction pattern and its confidence in the same way with the feature vector extraction means 101 and the quality index extraction means 106 of FIG. 1, such as disclosed in the Provisional Publication No. 7079/'96.

The coordinate alignment means 1508 outputs the first confidence indication obtained by calculating a distance of the ridge direction pattern to a reference pattern in the same way with the quality index extraction means 130 of FIG. 13, where the distance is a minimum value of D of equation (47) obtained when the ridge direction pattern is most fitted to the reference pattern by positioning the ridge direction pattern to the reference pattern. Here, search range of the parallel/rotation displacement is set around the center of the fingerprint detected by the center detection means 1507 such as disclosed in the Provisional Publication No. 271884/'89 beforehand mentioned. Further, position of the ridge direction pattern and its confidence are normalized here by performing the affine transfer using the Affine parameter set giving the highest conformity. The coordinate alignment means 1508 outputs the ridge direction pattern as a vector value expressed by equation (22) referred to in connection with the first embodiments.

The vector transfer means 1504 performs the KLT of the vector output of the coordinate alignment means 1508 for outputting a feature vector according to equation (23) referring to the principal component vectors prepared in the principal component vector storing means 1503, in the same way with the vector transfer means 103 of FIG. 1.

The distance calculation means 1505 outputs the second quality index obtained by calculating minimum distance of the feature vector to the high-quality data set in the same way with the quality index extraction means 90 of FIG. 9 beforehand described in connection with the second embodiments.

The contribution calculation means 1506 outputs the third quality index by calculating confidence value of the ridge direction pattern for each component of the feature vector according to equation (25), in the same way with the quality index extraction means 106 of FIG. 1 described in connection with the first embodiments.

The first, the second and the third confidence attribution means 1509, 1510 and 1511 output the first, the second and the third confidence value, respectively, for each component of the feature vector, obtained by referring to respective lookup table accessing with respective quality index thus obtained of the feature vector.

Contents of each of the first, second and the third lookup tables in the first, the second and the third error distribution information storing means 1513, 1514 and 1515 can be prepared in the same way as described in connection with the third, the second or the first embodiments, respectively, by analyzing respective error distribution obtained through the coordinate alignment means 1508, the distance calculation means 1505 or the contribution calculation means 1506, respectively, from a data set of fingerprint images having an appropriate quality range.

The first, the second and the third confidence value being denoted by three vectors $^1\sigma$, $^2\sigma$ and $^3\sigma$, respectively, the confidence estimation means 1512 estimates the confidence estimation $\sigma$ from the three vectors according to following equation.

$$\tilde{\sigma}_i = \sqrt{\sum_{j=1}^{3} {}^j\sigma_i^2} \qquad (50)$$

Here, $\sigma_i$ represents an i-th component of the confidence estimation $\sigma$, and $^j\sigma_i$ represents the i-the component of the first to the third confidence value $^j\sigma_1$.

Or, otherwise, the confidence estimation $\sigma$ may estimated as follows instead of above equation.

$$\sigma_i = m_j \mathrm{ax}^j \sigma_i \qquad (51)$$

The confidence estimation means 1512 outputs the feature vector processed through the KLT and its confidence estimation $\sigma$ as output of the fracture extraction section 151.

By applying the confidence estimation thus integrated from more than one quality index value, a better result can be obtained, demerits of each individual quality index being compensated, according to the fourth embodiment.

Fifth Embodiment of the Skin Pattern Matching System

In the following paragraphs, a fifth embodiment of the skin pattern matching system of the invention will be described, wherein Fourier transformation of the skin pattern image is applied to the feature vector extraction thereof.

Figure 16:
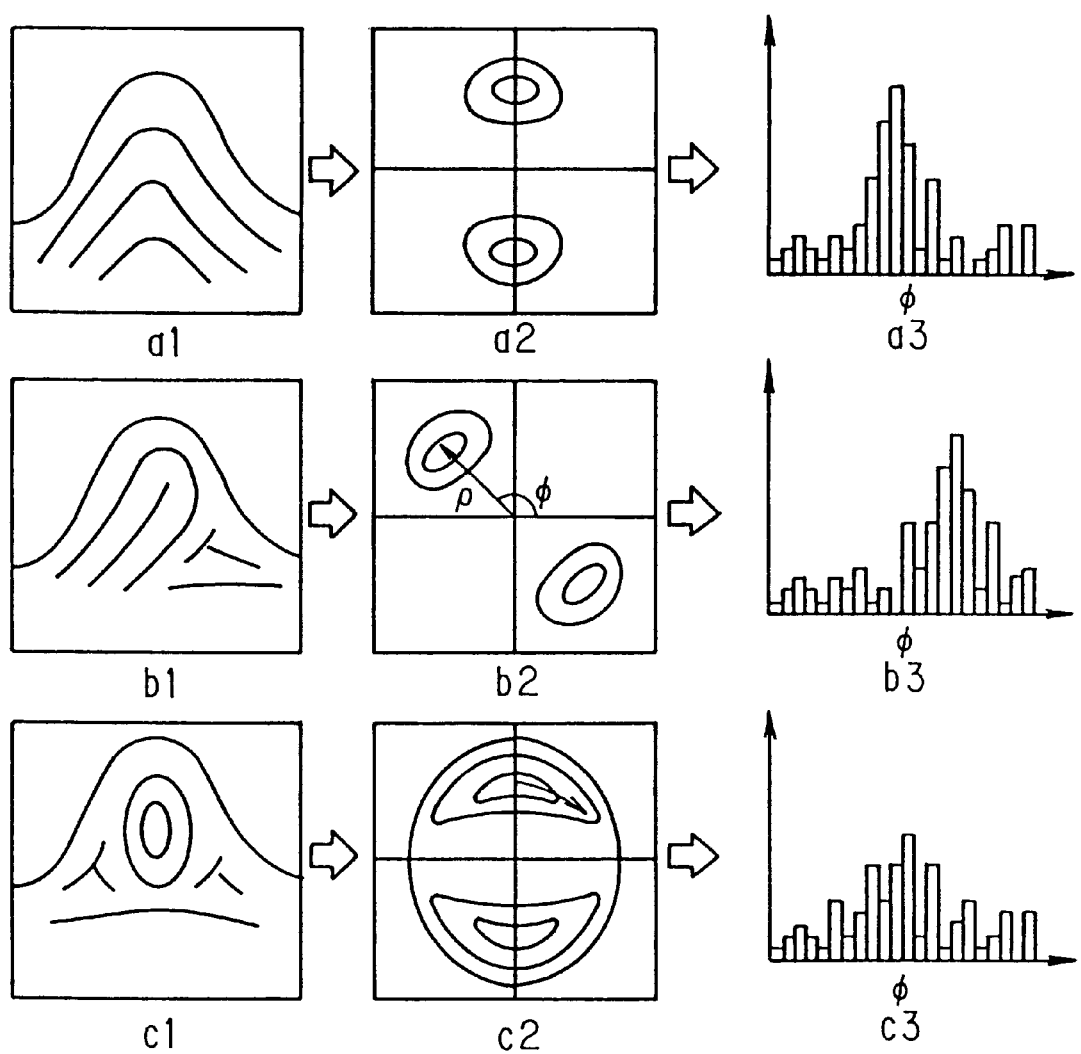
FIG. 16 is a schematic diagram for explaining principle of the fifth embodiment.

First, principle of the fifth embodiment is explained referring to a schematic diagram of FIG. 16.

In representatives of the fingerprint pattern, there are the Arch, the Loop, the Whorl and so on. These patterns have their own forms, and hence, 2-dimensional power spectrums of Fourier transformation thereof have their own features, as illustrated in FIG. 16.

Referring to FIG. 16, a1, b1 and c1 represent the Arch, the Loop and the Whorl, respectively, a2, b2 and c2 representing characteristic parts of the Fourier power spectrums thereof (direct current, or zero frequency component, being set, to their centers).

In each of the Fourier power spectrums a2, b2 and c2, lower frequency components, that is, inner patterns, owe to uneven stamping, stamping pressure or background of the fingerprint image and they are not significant for discriminating the fingerprint. The spectrum lines of horizontal and vertical zero frequency that is, xy-coordinate axis-like lines, represent noises owing to discontinuity at end lines of the image, and have no reference with the fingerprint discrimination.

On the other hand, the higher frequency components, that is, the outer patterns such as ⋶-like pattern of the spectrum a2 or a ring pattern of the spectrum c2, represent features concerning fingerprint ridge lines, and substantially show following three characteristics.

1. Radial distance $\rho$ of spectrum distribution center from the direct current component represents mean value of the ridge line pitch;

2. Rotation direction Ø of the spectrum distribution center represents whether the fingerprint has right inclination or left inclination.
3. Whether the spectrum distribution is peak-like or ring-like corresponds to arch-like or whorl-like of the fingerprint.

Therefore, by sampling most characteristic frequency band from the Fourier power spectrum of the fingerprint pattern by filtering out unnecessary high frequency components and low frequency components, it feature value representing it whole fingerprint pattern can be extracted.

Column charts a3, b3 and c3 of FIG. 16 schematically illustrate feature values of respective fingerprint patterns a1, b1 and c1 sampled with a fixed frequency band, namely, with a fixed radial distance ρ around the direct current ($0 \leq \emptyset < \pi$).

Now, the fifth embodiment of the skin pattern matching system of the invention based on the above principle is described.

Figure 17:
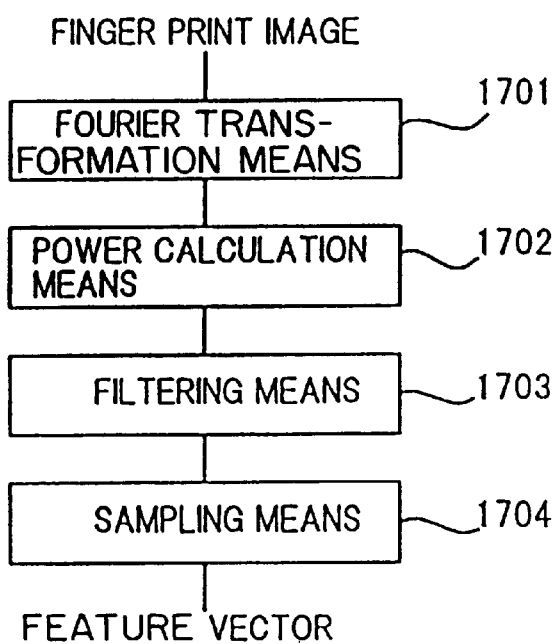
FIG. 17 is a block diagram illustrating a feature vector extraction means of the fifth embodiment.

FIG. 17 is a block diagram illustrating a feature vector extraction means of the fifth embodiment corresponding the feature vector extraction means 102 of FIG. 1, comprising a Fourier transfer means 1701 for performing Fourier transfer of it fingerprint image, a power calculation means 1702 for calculating Fourier power spectrum of the Fourier transformation output of the Fourier transfer means 1701, a filtering means 1703 for filtering the Fourier power spectrum, and a sampling means 1704 for sampling characteristic spectrum components from output of the filtering means 1703 to be output as the feature vector.

The skin pattern matching system of the fifth embodiment comprising the above feature vector extraction means operates as follows.

The Fourier transfer means 1701 performs digital Fourier transfer of the input 2-dimensional pattern image. As to the digital Fourier transfer, it is well known and also described in pp. 5–11 of the "Handbook of Image Analysis", explanation thereof being omitted. Here, the fingerprint image is expressed by h(x, y), Fourier transfer thereof by F(h(x, y)) and Fourier components transferred by the Fourier transfer means 1701 by H(u, v), where (x, y) represents coordinates in the real space and (u, v) represents corresponding coordinates in the frequency domain. Hence, manipulation performed by the Fourier transfer means 1701 is expressed by following equation.

$$H(u, v) = F(x, y)) \quad (52)$$

The power calculation means 1702 calculate absolute value ||H(u, v)|| of the Fourier components H(u, v), obtained as a complex number, as follows.

$$\|H\|(u, v) = \sqrt{R(H(u, v))^2 + T(H(u, v))^2} \quad (53)$$

where R(H(u, v)) and T(H(u,v)) represent real part and imaginary part of the Fourier components H(u, v), respectively.

The filtering means 1703 performs, for example, convolution operation (Gaussian filtering) making use of well known 2-dimensional Gaussian function G(u, v; σ), for filtering the Fourier power spectrum ||H(u, v)|| output of the Fourier transfer means 1702, as follows when filtered image data is expressed by J(u, v).

$$J(u, v) = \sum_p \sum_q G(p, q; \sigma) \|H(u + p, v + q)\| \quad (54)$$

-continued $$G(u, v; \sigma) = \frac{1}{2\pi\sigma^2} \exp\left(-\frac{u^2 + v^2}{2\sigma^2}\right) \quad (55)$$

Here, the parameter σ of the 2-dimensional Gaussian function may be set to be about 3 to 7 pixels (counted in the frequency domain), when the input image has 512×512 pixels.

Figure 18:
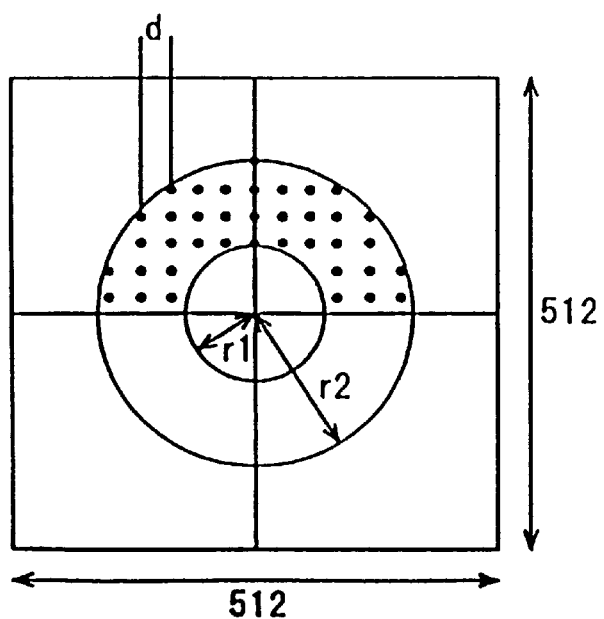
FIG. 18 is a schematic diagram illustrating sampling operation of of the sampling means 1704 of FIG. 17.

The sampling means 1704 samples pixel data of the filtered Fourier power spectrum J(u, v) in a frequency band defined by following equations at an appropriate interval d, as illustrated in a schematic diagram of FIG. 18.

$$r_1 < u^2 + v^2 < r_2 \quad (56)$$

$$v \geq 0 \quad (57)$$

In an example of the embodiment, it feature vector $f$ is obtained from near 200 samples by setting $r_1=20$, $r_2=80$ and the sampling interval d as 10×10.

Size of the feature vector $\|f\|$ reflects signal intensity of the object fingerprint image, and so, call be used as the quality index of the feature vector $f$.

Thus, the feature vector and its quality index are obtained in the fifth embodiment of the skin pattern matching system. Other component than the feature vector extraction means may be configured in the same way with the first to the fourth embodiments heretofore described, by applying the above feature vector extraction means to the feature vector extraction means 102 of FIG. 1, for example.

Sixth Embodiment of the Skin Pattern Matching System and Fourth Embodiment of the Skin Pattern Analyzer In the embodiments heretofore described, the feature vector processed through the KLT is applied for the skin pattern matching verification or the skin pattern analysis. However, the scope of this invention of the image feature analyzer and the image matching system is not limited in the feature vector processed through the KLT. As an example without the KLT, an embodiment making use of feature values defined by singular points such as the cores and the deltas in the fingerprint will be described in the following paragraphs.

Maximum number of the cores and the deltas in the fingerprint is usually found in the Whorl, wherein are found four singular points, two cores and two deltas. There can be defined $_4C_2=6$ segments connecting these four singular points. Therefore, 12 feature values can be obtained, that is, 6 lengths of the 6 segments and 6 numbers of ridge lines crossing the 6 segments. Further, each of the 12 feature, value has each confidence value, as described in Uchida et al., previously referred to. These confidence values can be used for the quality index (and called the quality index, hereafter).

Therefore, following vectors can be defined from these feature values and their quality indexes.

$$\text{feature value: } v = \begin{pmatrix} v_1 \\ v_2 \\ \vdots \\ v_i \\ \vdots \\ v_{12} \end{pmatrix} \quad (58)$$

$$\text{quality index: } q = \begin{pmatrix} q_1 \\ q_2 \\ \vdots \\ q_i \\ \vdots \\ q_{12} \end{pmatrix} \quad (59)$$

Here, when there are found but less than four singular points as in the Loop, or when some singular points are failed to be detected, corresponding components of the quality vector v are substituted with a value out of bounds (−1, for example, when the confidence value is 0 to 1).

Figure 19:
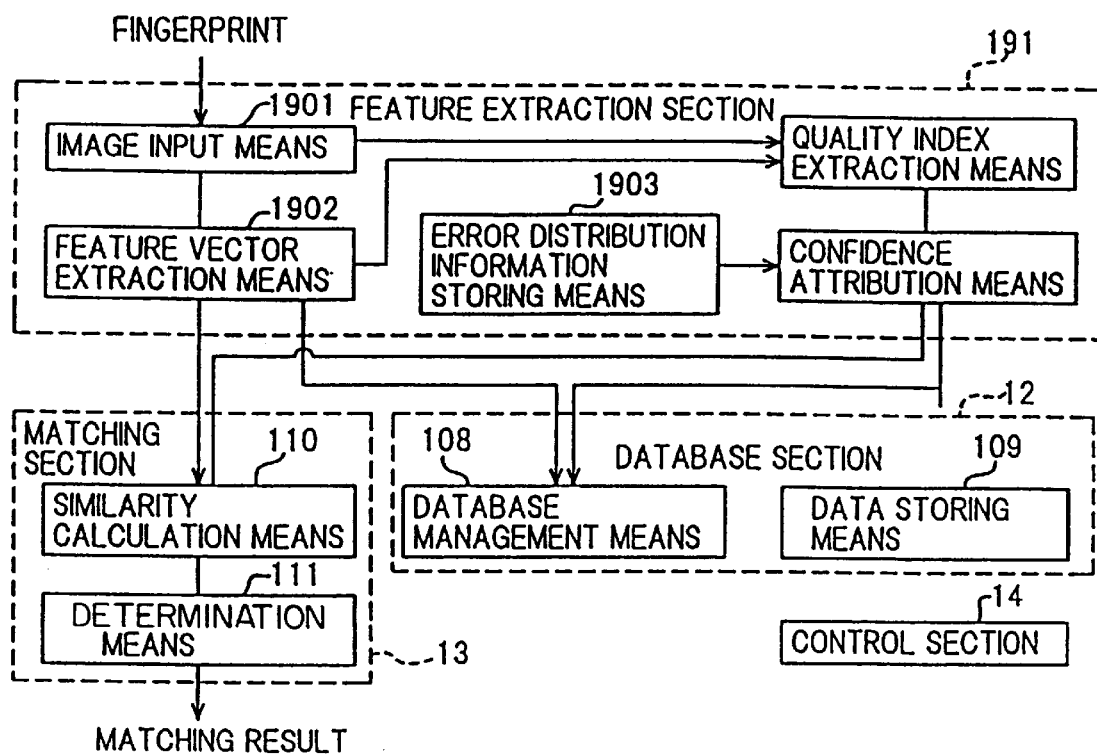
FIG. 19 is a block diagram illustrating a basic configuration of the sixth embodiment of the skin pattern matching system.

FIG. 19 is a block diagram illustrating a basic configuration of the sixth embodiment of the skin pattern matching system, wherein the vector transfer means 103 and the principal component vector storing means 104 are omitted compared to the skin pattern matching system of FIG. 1.

Referring to FIG. 19, the sixth embodiment of the skin pattern matching system has, a feature extraction section 191 comprising an image input means 1901, a feature vector extraction means 1902, a error distribution information storing means 1904 and a confidence attribution means 1905, a database section 12 comprising a data storing means 109 wherein prepared the feature data extracted by the feature extraction section 191, and a database management means 108 taking charge of reference or registration of the feature data in the data storing means 109, a matching section 13 for performing the skin pattern matching verification to output matching results comprising a similarity calculation means 110 for calculating a similarity of the feature data supplied from the feature extraction means 191 to each of the feature data stored in the database section 12, and a determination means 111 for determining accordance/discordance from the similarity calculated by the similarity calculation means 110, and a control section 14 for controlling each of the above elements.

The database management section 12, the matching section 13 and the control section 14 operates in the same way with those of FIG. 1, and so, operation of the feature extraction section 191 is described, here.

The feature vector extraction means 1902 extracts the feature vector v according to equation (58) as above described referring to the singular points of the cores and deltas.

The quality index extraction means 1904 extracts the quality vector q according to equation (59).

In the error distribution information analyzing means 1903, there is prepared a lookup table wherein registered standard deviation of errors $\sigma_i(q_i)$ of components $v_i$ of each dimension of the feature vector v. When the quality index value is that of out of bound, −1, because of missing data, a fixed value is registered there. As for the fixed value, it is sufficient to be more than 1000 times of the ordinary standard deviation, or zero when inverse standard deviation is registered in the lookup table.

The confidence attribution means 1905 outputs a confidence vector σ by referring to the lookup table in the error distribution information analyzing means 1903 by accessing thereto with the quality vector q.

Then, the same procedure follows as beforehand described in connection with the first embodiment of the skin pattern matching system.

Figure 20:
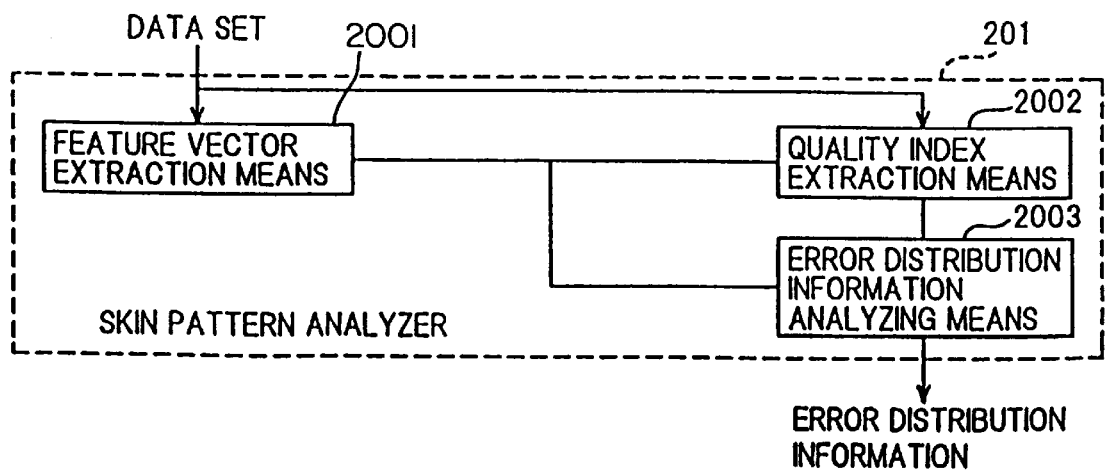
FIG. 20 is a block diagram of a fourth embodiment of the skin pattern feature analyzer of the invention.

The lookup table in the error distribution information analyzing means 1903 is prepared by a fourth embodiment of the skin pattern feature analyzer, whereof a block diagram is illustrated in FIG. 20.

Referring to FIG. 20, the skin pattern analyzer of the fourth embodiment comprises a feature vector extraction means 2001, a quality index extraction means 2002 and an error distribution information analyzing means 2003.

The feature vector extraction means 2001 extracts feature vectors v front a data set of a plurality, 10 thousands, for example, of paired images according to equation (58). The quality index extraction means 2002 extracts quality vectors q from the data set according to equation (59).

The error distribution information analyzing means 2003 prepares a 2-dimensional lookup table by calculating error distribution for each quantized quality index value of each dimension, analyzing the error distribution in the same way with the error distribution information analyzing means 506 of FIG. 5. Here, data corresponding to the quality index value out of bounds, −1, are omitted from the accumulation operation regarded as defect data.

Thus, the skill pattern feature analyzer and the skin pattern matching system of high-precision can be embodied even without the KLT.

In the embodiments heretofore described of the invention, matching of one fingerprint is discussed. However, it, can be easily understood that the present invention call be applied to the Ten Print Card.

When applying to the Tell Print, Card, the operation for one finger its heretofore described may be repeated ten times for each of ten fingers, preparing data of feature vectors and confidence vectors for ten fingers in the database section and so on.

Further, the condensed feature vectors (5-dimensional, for example,) processed through the KLT of ten fingers may be integrated into a 50-dimensional feature vector, and may be condensed again through the KLT. Applying upper one or two dimensions thereof, the data amount to be treated of ten fingers may be still reduces. As for confidence value in the case, equation (25) can be applied by obtaining quality value q(C) from confidence vector of each finger, for example.

Thus, by repeating the KLT for whole card data, discrimination performance call be still improved without, increasing dimension number of feature values. Further, treating the whole card data is especially effective in the case matching verification operation is finished when similarity distance accumulation attains to a threshold value, since discordant card data can be rejected in earlier stage of the operation by treating the whole card data at the same time.

Figure 21:
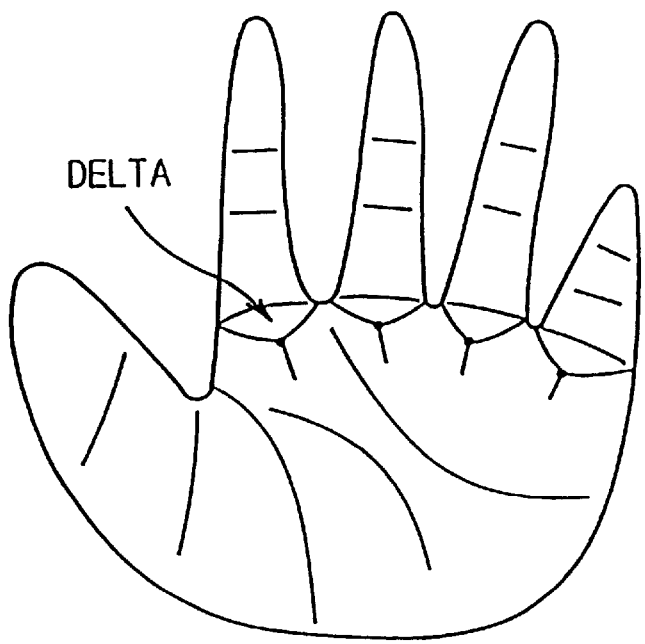
FIG. 21 is a schematic diagram illustrating a palm pattern.
Figure 22:
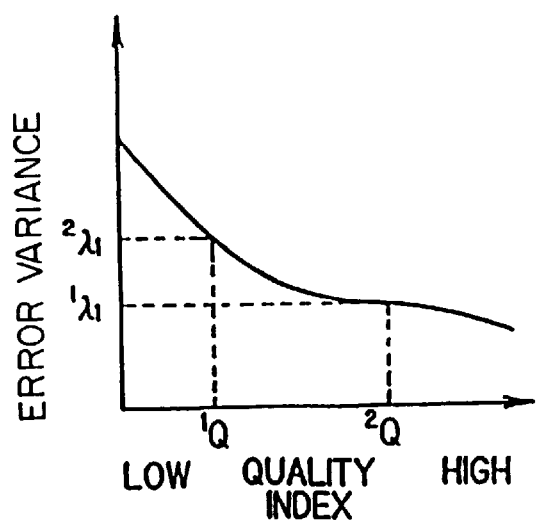
FIG. 22 is a schematic diagram illustrating inter-relation between error variance and quality index.

Heretofore, the present invention is described mainly in connection with embodiments applied to fingerprint, identification However, it goes without saying that there are many applications or modifications in the scope of the invention. For example, the invention can be applied just the same way to the palm print identification. In the palm print, there are four delta parts at each finger base except the thumb, as illustrated in FIG. 21. Therefore, by cutting out 512×512 pixel data of 500 dpi of the four deltas from a paper stamped with a palm print, they can be treated as a four fingerprint, card, instead of the Ten Print Card.

What is claimed is:

1. An image feature matching system for collating a pattern image making use of a feature information data set of the pattern image including a feature vector of the pattern image and confidence information of the feature vector attributed to each component of the feature vector; said image feature matching system comprising:

a database section wherein the feature information dataset of each of a plurality of pattern images is registered; and a matching section for collating the pattern image by discriminating accordance/discordance of the feature information data set of the pattern image to each of the feature information data set registered in said database section according to distance between two feature vectors each included in respective feature information data set calculated in consideration of the confidence information of the two feature vectors.

* * * * *